(12) United States Patent
Younker

(10) Patent No.: US 10,801,501 B2
(45) Date of Patent: Oct. 13, 2020

(54) FLUID SYSTEM WITH A CONTINUOUSLY VARIABLE TRANSMISSION

(71) Applicant: Kevin Ralph Younker, Athabasca (CA)

(72) Inventor: Kevin Ralph Younker, Athabasca (CA)

( * ) Notice: Subject to any disclaimer, the term of this patent is extended or adjusted under 35 U.S.C. 154(b) by 16 days.

(21) Appl. No.: 15/535,705

(22) PCT Filed: Jun. 10, 2016

(86) PCT No.: PCT/CA2016/050665
§ 371 (c)(1),
(2) Date: Jun. 13, 2017

(87) PCT Pub. No.: WO2017/008145
PCT Pub. Date: Jan. 19, 2017

(65) Prior Publication Data
US 2018/0001123 A1    Jan. 4, 2018

Related U.S. Application Data

(63) Continuation of application No. 14/800,546, filed on Jul. 15, 2015.

(51) Int. Cl.
*F04D 13/02* (2006.01)
*F16H 9/16* (2006.01)
(Continued)

(52) U.S. Cl.
CPC ............ *F04D 13/021* (2013.01); *A62C 3/07* (2013.01); *A62C 27/00* (2013.01); *F04B 17/06* (2013.01); *F16H 9/16* (2013.01); *F16H 55/56* (2013.01)

(58) Field of Classification Search
CPC . F04B 17/06; A62C 3/07; A62C 27/00; F04D 13/021; F16H 9/16; F16H 55/56
(Continued)

(56) References Cited

U.S. PATENT DOCUMENTS 2,288,114 A * 6/1942 Smith .................. B60H 1/3222
  474/13
2,766,698 A * 10/1956 Carter ................... F04D 29/445
  415/186

(Continued)

FOREIGN PATENT DOCUMENTS

CN          1411876 A       4/2003
CN       201534577 U       7/2010

OTHER PUBLICATIONS

International Search Report and Written Opinion; dated Jul. 22, 2016; PCT/CA2016/050665.
(Continued)

*Primary Examiner* — Christopher S Bobish
(74) *Attorney, Agent, or Firm* — Shackelford, Bowen, McKinley & Norton, LLP; Henry L. Ehrlich

(57) ABSTRACT

A technique for providing a water pumping system suitable for fighting wildfire, flood mediation, sewage transport, and the like is revealed. The system includes an internal combustion engine, a CVT with an input shaft and an output shaft, and a pump with an axial flow impeller. In one variation, multiple impeller stages are used and/or several systems are daisy-chained to provide for suitable delivery of water from its source. In another form, the system is carried by an all-terrain vehicle, side-by-side, or the like, to reach remote areas that need to move water to address a hazardous condition.

20 Claims, 11 Drawing Sheets

(51) Int. Cl.
*A62C 27/00* (2006.01)
*F04B 17/06* (2006.01)
*A62C 3/07* (2006.01)
*F16H 55/56* (2006.01)

(58) Field of Classification Search
USPC ...................................................... 474/8, 28
See application file for complete search history.

(56) References Cited

U.S. PATENT DOCUMENTS

| | | | |
|---|---|---|---|
| 3,180,423 A | | 4/1965 | Gibbs |
| 3,362,241 A | * | 1/1968 | Heyer ..................... F16H 9/16 474/29 |
| 3,604,283 A | * | 9/1971 | Van Doorne ............. F16G 1/26 474/265 |
| 3,757,594 A | * | 9/1973 | Kumm .................... F16H 9/125 474/28 |
| 5,091,082 A | * | 2/1992 | Yost ...................... B01D 29/035 210/196 |
| 5,476,146 A | * | 12/1995 | Brown ................... A62C 27/00 169/14 |
| 5,488,995 A | * | 2/1996 | Kuwahara ............... A62C 27/00 169/24 |
| 5,599,164 A | * | 2/1997 | Murray ................... F04D 13/14 415/144 |
| 6,029,750 A | * | 2/2000 | Carrier ................... A62C 27/00 169/13 |
| 6,527,662 B2 | * | 3/2003 | Miyata ................... F16H 37/022 475/216 |
| 6,612,373 B2 | * | 9/2003 | Brennan .................. A62C 3/07 169/62 |
| 7,007,761 B1 | * | 3/2006 | Johnson, IV ........... A62C 27/00 169/24 |
| 7,836,964 B2 | * | 11/2010 | Groonwald ............. A62C 27/00 165/41 |
| 8,845,283 B2 | * | 9/2014 | Cairo .................... F04D 29/023 415/173.3 |
| 9,046,895 B2 | | 6/2015 | Orr et al. |
| 9,181,953 B2 | * | 11/2015 | Steger ................. F04D 15/0066 |
| 2002/0146319 A1 | * | 10/2002 | Dorsch ................... F04D 7/045 415/206 |
| 2005/0056435 A1 | * | 3/2005 | Price ..................... A62C 27/00 169/52 |
| 2005/0058555 A1 | | 3/2005 | Scott |
| 2005/0126631 A1 | * | 6/2005 | Gorman, Jr. ........... A62C 27/00 137/128 |
| 2006/0144598 A1 | * | 7/2006 | Johnson, IV .......... A62C 27/00 169/24 |
| 2006/0204384 A1 | * | 9/2006 | Cornell .................... F04D 1/06 417/423.5 |
| 2006/0245934 A1 | * | 11/2006 | Deivasigamani ....... F04B 17/00 417/212 |
| 2006/0260331 A1 | * | 11/2006 | Andreychuk ........... F04B 15/08 62/50.2 |
| 2009/0294139 A1 | * | 12/2009 | Wilson ................ A62C 3/0292 169/24 |
| 2010/0038100 A1 | * | 2/2010 | Schuetzle ............. A62C 27/00 169/52 |
| 2012/0024548 A1 | * | 2/2012 | Chang ................... A62C 27/00 169/52 |
| 2012/0227389 A1 | * | 9/2012 | Hinderks ................. F01B 1/10 60/317 |
| 2013/0098642 A1 | * | 4/2013 | McLoughlin ........... F04B 17/05 169/43 |

OTHER PUBLICATIONS

Notice of Allowance; dated Apr. 24, 2017; Canadian Application No. 2,946,840.
Feb. 12, 2019, Supplemental European Search Report and Opinion, EP Application EP 16 82 3580.

* cited by examiner

FLUID SYSTEM WITH A CONTINUOUSLY VARIABLE TRANSMISSION

TECHNICAL FIELD

The present disclosure relates to techniques, systems, methods, processes, apparatus, devices, combinations, and equipment for pumping fluids. More particularly, the present disclosure relates to pumping techniques for fighting fire, mitigating flooding, moving fluids from one location to another and similar applications. More particularly, the present disclosure relates to pumping equipment that comprises a rotary power source, a continuously variable transmission and a rotodynamic pump.

BACKGROUND

Existing pumping systems are ill-suited to transport to remote locations to fight wildfire, flooding, and address other conditions hazardous to the environment and/or well-being of people. Frequently, these existing systems weigh considerably more than can be readily carried by vehicles over rough terrain. So-called pump trucks, commonly found in fire-truck fleets, are generally incapable of travel over such terrain and typically provide poor return under such situations. Likewise, airdrops of water and/or fire retardants to fight fire can be prohibitively expensive.

SUMMARY

Embodiments of the present disclosure relate to systems, apparatus, methods, kits, processes, combinations, equipment, and devices for pumping liquids. Other embodiments include techniques to apply, design, prepare, form, make, display, generate, and/or use pumps with a continuously variable transmission (CVT) to drive a water pump for ameliorating hazardous conditions, including but not limited to floods, fires, sewage treatment plant overflows, and the like.

A further technique of the present disclosure includes: (a) delivering a mobile water-pumping system to a selected site proximate to a water source that includes a rotary power source, a CVT with a variable turn ratio, and a pump with a rotor, an intake in fluid communication with the water source, and a discharge outlet in fluid communication with a discharge conduit; (b) driving the CVT with the rotary power source; (c) in response to driving the CVT, turning the rotor to convey water from the water source through the discharge conduit; (d) with the CVT, regulating rotational speed of the rotary power source relative to a selected target as the rotor turns; (e) delivering the water from the delivery conduit to a selected location to ameliorate a hazardous condition; (f) during the delivering of the water, increasing the head developed by the pump; and (g) in response to the increasing of the head, decreasing the turn ratio of the CVT to reduce water capacity provided by the pump while maintaining the rotational speed of the rotary power source relative to the selected target. In one embodiment, the pump is a rotodynamic type with the rotor being an axial impeller.

Another embodiment of the present disclosure includes: (a) a rotary power source with a power source output shaft; (b) a CVT mechanically coupled to the power source output shaft that includes a CVT power output shaft with a variable turn ratio between a CVT input rotational speed maintained by the power source output shaft and a CVT output rotational speed of the CVT power output shaft; and (c) a rotodynamic pump including a rotor driven by the CVT power output shaft, the pump including an intake and an outlet and being structured to convey water from the intake through the outlet over a water capacity range with a varying head. One nonlimiting refinement includes means for maintaining the CVT input rotational speed relative to a target speed and means for decreasing the water capacity range in response to increasing resistance from an increase in the head of the pump.

Still another embodiment of the present disclosure comprises a water pumping system including: (a) means for providing rotational power, (b) means for transmitting rotational power by selectively varying a turn ratio over a desired range, (c) means for pumping water, and (d) means for controlling the turn ratio of the transmitting means. In one nonlimiting form, the rotational power means includes means for internally combusting fuel to rotate a power shaft mechanically coupled to the transmitting means, the transmitting means includes means for continuously varying the turn ratio between a first rotating component and a second rotating component, the pumping means includes means rotodynamically pumping water with a rotor, and the controlling means includes means for mechanically varying the turn ratio in response to a change in head of the pumping means.

Yet another embodiment of the present disclosure comprises: (a) operating a vehicle carrying a water pumping system, the system including an internal combustion engine, a CVT with an input shaft mechanically coupled to a first variable pulley and an output shaft mechanically coupled to a second variable pulley, and a pump; (b) driving the input shaft of the CVT with mechanical power from the internal combustion engine; (c) turning the output shaft of the CVT with a variable turn ratio between the input shaft and the output shaft; (d) turning a rotor of the pump by mechanical coupling to the output shaft; (e) by adjusting the first variable pulley and the second variable pulley, regulating rotational speed of the internal combustion engine by decreasing water capacity of the pump in response to increased head of the pump. In one embodiment, the rotor is an axial flow impeller.

A further embodiment includes a vehicle carrying a water pumping subsystem that comprises: (a) means for driving an input shaft of a CVT with rotary mechanical power; (b) means for turning an output shaft of the CVT with a variable turn ratio relative to rotation of the input shaft and rotation of the output shaft; (c) means for rotating a rotor of a pump; and (d) means for regulating the variable turn ratio with a CVT control mechanism responsive to mechanical resistance generated by head of the pump to correspondingly adjust water capacity of the pump over a target range and regulate rotational speed of the internal combustion engine relative to a steady state target.

A further embodiment includes a pumping system comprising a motor with an output, a pump with a fluid input, a fluid output and an impeller positioned inside the pump between the fluid input and the fluid output. The pumping system also includes a continuously variable transmission that is operatively connected to the output of the motor and to the impeller for providing rotary power from the motor to the impeller. The motor, the pump and the continuously variable transmission have a collective dry weight between about 200 pounds and 1000 pounds and the pumping system can provide a fluid output between 1 to 5000 imperial gallons per minute when about 1 to about 500 feet of static head pressure is exerted on the impeller.

The above introduction is not to be considered exhaustive or exclusive in nature. This introduction merely serves as a forward to further advantages, apparatus, applications, arrangements, attributes, benefits, characterizations, combinations, components, compositions, compounds, conditions, configurations, constituents, designs, details, determinations, devices, discoveries, elements, embodiments, examples, exchanges, experiments, explanations, expressions, factors, features, forms, formulae, gains, implementations, innovations, kits, layouts, machinery, materials, mechanisms, methods, modes, models, objects, options, operations, parts, processes, properties, qualities, refinements, relationships, representations, species, structures, substitutions, systems, techniques, traits, uses, utilities, variations, and/or other aspects that shall become apparent from the description provided herewith, and from any claims, drawing, and/or other information included herein.

BRIEF DESCRIPTION OF THE DRAWINGS

These and other features of the present disclosure will become more apparent in the following detailed description in which reference is made to the appended drawings:

FIG. 6 and FIG. 7 both utilize inter-sheet identifiers/connectors A6, B5, and C5 to extend arrowhead-directed flow lines from one sheet to another, and correspondingly link flowchart operators on different sheets where appropriate.

DETAILED DESCRIPTION

Figure 1:
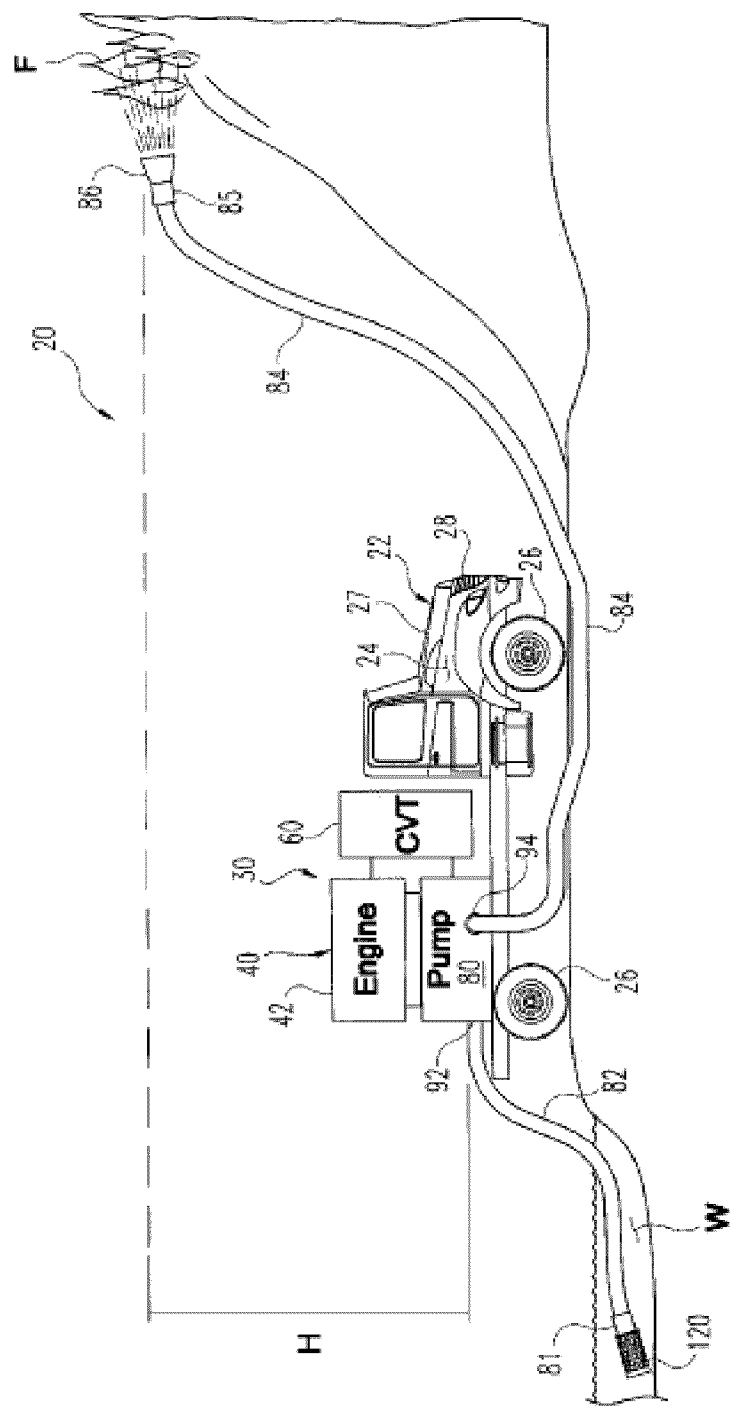
FIG. 1 is a schematic of a vehicle-carried pumping system of the present disclosure.

In the following description, various details are set forth to provide a thorough understanding of the principles and subject matter of each embodiment described and/or claimed herein. To promote this understanding, the description refers to representative embodiments-using specific language to communicate the same accompanied by any drawing(s) to the extent the described subject matter admits to illustration. In other instances, when the description subject matter is well-known, such subject matter may not be described in detail and/or may not be illustrated by any drawing(s) to avoid obscuring information to be conveyed hereby.

Considering the embodiments of this disclosure, those skilled in the relevant art will recognize that such embodiments may be practiced without one or more specific details included in the description. It is also recognized by those skilled in the relevant art that the full scope of all embodiments described herein can encompass more detail than that made explicit herein. Such unexpressed detail can be directed to apparatus, applications, arrangements, combinations, components, compositions, compounds, conditions, configurations, constituents, designs, devices, elements, embodiments, features, forms, formulae, implementations, kits, modifications, materials, mechanisms, methods, modes, operations, parts, processes, properties, qualities, refinements, relationships, structures, systems, techniques, and/or uses-just to name a few. Accordingly, the description of embodiments should be seen as illustrative only and not limiting.

Definitions

Unless defined otherwise, all technical and scientific terms used herein have the same meaning as commonly understood by one of ordinary skill in the art to which this disclosure belongs.

"About" as used herein refers to an approximately +/−10% variation from a given value. It is to be understood that such a variation is always included in any given value provided herein, whether or not it is specifically referred to.

"Water" broadly refers to a liquid compound in which a molecule consists of two hydrogen (H) atoms covalently bonded to a single oxygen (O) atom (dihydrogen monoxide or $H_2O$), inclusive of any isotope of hydrogen or oxygen and inclusive of temporary ionic forms of the proton (Hi) and hydroxyl ion (OH). Further, as used herein "water" is inclusive not only of liquid $H_2O$ in pure form, but also any nongaseous fluid mixture including liquid $H_2O$ and one or more other substances in a gas, liquid, and/or solid state. By way of nonlimiting example, water includes a nongaseous fluid in which liquid $H_2O$ is mixed with: (a) one or more different gases, liquids, and/or solids (solutes) in solution each with some nonzero degree of dissolution/solubility where the liquid $H_2O$ is the solvent; (b) any gas or combination of different gases to form foam(s); (c) solid matter dispersed in a slurry, suspension, or colloid; (d) one or more other liquids immiscible with the liquid $H_2O$, taking either a heterogeneous form or a more dispersed homogeneous form (like in an emulsion); and/or (e) one or more different biochemical compounds, biotic substances, or organisms. Correspondingly, water as used herein may be from any artificial or natural source if of a nongaseous fluid form including liquid $H_2O$, such as: a potable or unpotable liquid, freshwater or seawater, and/or water from any lake, loch, river, reservoir, canal, channel, public utility, water tower, well, pool, stream, brook, creek, pond, spring, swamp, marsh, bayou, estuary, lagoon, bay, harbor, gulf, fjord, sea, and/or ocean—to name just a few contemplated sources.

"Water Capacity" as used herein means the volumetric flow rate of water (see definition above) relative to time in imperial Gallons Per Minute (GPM).

"Head" or "Hydraulic Head" (alternatively designated by the variable "H") means the distance in elevation between two points in a body of fluid. This distance corresponds to the resulting pressure of the fluid at the lower point. For pump arrangements, the lower point is typically an arbitrary datum relative to the point of pump discharge and the higher point is the point of fluid output of a conduit connected to the pump discharge. Alternatively, the reverse may be the case with the lower point being the point of fluid output of the conduit connected to the pump discharge and the higher point is an arbitrary datum relative to the point of pump discharge.

"Static Head" or "Discharge Head" or "Static Height" or "Static Pressure Head" (all alternatively designated by the variable "SH") means the maximum height a pump can deliver a fluid above an arbitrary datum relative to the pump discharge. While expressed in terms of elevational distance (height), like the more general term "Head" this measurement directly corresponds to fluid pressure.

"Hydrostatic Pressure" (alternatively designated by the variable "HP") in a liquid can be expressed as the product of the multiplic and variables: height of the liquid column or "hydraulic head" (H), density of the liquid (p), and gravitational acceleration (g); such that HP=Hpg and conversely H=HP/(pg). Frictional loss, turbulence, cavitation, and other factors may influence the determination of H and HP in a given application.

"CVT" is an abbreviation for the term "Continuously Variable Transmission" which for the purposes of this disclosure may be used interchangeably with the term "constantly variable transmission".

"Axial Flow Impeller" means a pump rotor turning about an axis of rotation to impart a fluid flow velocity with a magnitude greatest along a direction approximately parallel to the axis of rotation.

"Radial Flow Impeller" means a pump rotor turning about an axis of rotation to impart a fluid flow velocity with a magnitude greatest along a direction approximately perpendicular to the axis of rotation.

"Mixed Flow Impeller" means a pump rotor turning about an axis of rotation to impart a fluid flow velocity with magnitude greatest along a direction approximately oblique to the axis of rotation.

"Rotodynamic Pump" or "Velocity Pump" means a pump that imparts kinetic energy to a fluid in the form of a flow velocity increase with a radial flow impeller, an axial flow impeller, a mixed flow impeller, or other rotor. This increase in kinetic energy may be converted to potential energy (pressure) by subsequently reducing the flow velocity (i.e., within the pump, at the pump discharge, or otherwise downstream of the pump). In principle, energy is continuously imparted to a rotodynamically pumped fluid and consistently added in a kinetic form (velocity increase), but actual practice may be somewhat less ideal. Optionally, a rotodynamic pump may include corresponding vanes, blades, guides, shrouds, volutes, diffusers, or the like suitable to the particular type of impeller/rotor and casing employed; and/or may optionally include multiple stages with the same or different impeller/rotor types arranged in series (daisy-chain), in parallel, or a combination of both. In contrast to the rotodynamic pump/velocity pump, a positive displacement pump captures/traps a fixed fluid amount and discharges it to provide a constant fluid flow at a given speed that in theory is independent of pump discharge pressure (although practical implementation may fall short of such theory). It should be appreciated that a "centrifugal pump" is a type of rotodynamic pump that consistently encompasses the radial flow impeller type, but the meaning of this term is less consistent as to the inclusion or exclusion of axial or mixed flow impeller types.

"Endless Loop" means a closed ring structured to encircle, surround, enclose, circumscribe, and/or fit around at least two pulleys making contact with each one to transfer mechanical power therebetween. An endless loop may be formed from a belt, chain, band, cord, cable, strap, rope, fiber, filament, or other structure suitable to contact the corresponding pulleys for power transfer. A pulley may or may not define a groove, track, race, edge, channel, notch, fluting, furrow, shoulder, rail, ridge, step, ledge, score, or the like therealong to contact or receive an endless loop.

"Effective Diameter" means the distance a straight line segment extends across a pulley with two opposing segment endpoints coincident to two points of contact between such pulley and an endless loop (defined above) that drives and/or is driven by the pulley; such points of contact (segment endpoints) coinciding with where the endless loop last touches the pulley just before separating therefrom, such segment being approximately perpendicular to a fixed axis of rotation about which the pulley turns, and such pulley being variable to change the distance while rotating about such axis. For a circular type of pulley, such segment may correspond to a diameter (segment intersecting the axis of rotation) or chord of a circle (segment not intersecting the axis of rotation). However, this definition also applies to any other variable pulley shape with an effective diameter range and turns about a fixed rotational axis as it drives or is driven by an endless loop. In correspondence, this definition applies to pulleys provided by a number of radially extending spokes to engage an endless loop (with or without a rim connecting the spokes), interlaced cones, a cage-like structure patterned with edges and vertices corresponding to a circular or cone type of geometric shape, and a single bar-like structure rotating at its center with ends configured to engage an endless loop-just to name a few examples. The change in effective diameter with the change in distance over the operative range may or may not be proportional, continuous, smooth, and/or linear in a mathematical sense. In one embodiment, pulley variability to change effective diameter corresponds to change in pulley width by increasing or decreasing the distance separating opposing sheave portions (defined below) along the axis of rotation; however, in other forms, variability may be realized through a different adjustment.

"Nonferrous" means any material composed of no more than about one-half percent (0.5%) iron (Fe) by weight.

"Sheave Portion" means a part of a variable pulley that contacts an endless loop for at least a portion of the variable pulley effective diameter operating range-such endless loop driving and/or being driven by such pulley. A sheave portion may or may not completely or partly define a groove, track, race, edge, channel, notch, fluting, furrow, shoulder, rail, ridge, step, ledge, score, or the like along its circumference or its side to guide or make endless loop contact.

The above listing of one or more abbreviations, acronyms, and/or definitions apply to any reference to the subject terminology herein unless explicitly set forth to the contrary, and shall apply whether set forth in lower case, upper case, or capitalized letters. Any acronym, abbreviation, or terminology defined in parentheses, quotation marks, or the like elsewhere in the present disclosure likewise shall have the meaning imparted thereby throughout the present disclosure unless expressly stated to the contrary or unless identical to an entry of the immediately preceding numerical listing of abbreviations, acronyms, and/or definitions, in which case such listing prevails.

Referring to the depicted embodiment of FIG. 1, a mobile system 20 is illustrated. System 20 includes a vehicle 22 in a form structured to travel over rough terrain with a Four-Wheel Drive (FWD) subsystem 24. Correspondingly, the subsystem 24 includes four ground-engaging wheels 26 (only two of which are shown), however, more or less than four wheels 26 are also contemplated by the present disclosure. The FWD subsystem 24 includes any suitable vehicular propulsion power source 27 (the prime mover for propulsion/operation of the vehicle 22). The vehicular power source 27 is more particularly depicted in FIG. 1 as an internal combustion engine 28 with standard supporting components and subordinate subsystems like a fuel reservoir, a corresponding drive train with a transmission, operator controls, cooling circuit, and/or other auxiliary devices (not shown). Such transmission for the vehicle 22 may be structured with a fixed number of speeds (each corresponding to a number of different engine-to-wheel turn ratios or "gears") that is responsive to an operator controlled clutch (manual), an automatic, hydraulic (i.e. torque converter) variety with multiple discrete speeds/gears that change in accordance with a selected operational curve (targeting greatest engine output torque, power, efficiency, or the like), an electronically-controlled clutch or clutches operating similar to the hydraulic discrete gear type in the alternative or in addition. The system 20 further includes a pumping system 30. In some embodiments of the present disclosure, the vehicle 22 may be a side-by-side (sometimes called a Utility Task Vehicle (UTV) or Recreational Off-Highway Vehicle (ROV)), a ruggedized/customized all-terrain conveyance dedicated to the transport and application of the pumping system 30 with various subsystems being highly integrated and all subject to a centralized operator control, a flatbed or a pick-up truck with space sufficient to carry the pumping system 30, or the like. In another embodiment, the vehicle may be a watercraft. In one embodiment, the pumping system 30 requires a vehicle weight-capacity for transport of the pumping system 30 of between about 100 and about 1000 pounds. In another embodiment, the pumping system 30 requires a vehicle weight-capacity for transport of the pumping system 30 of between about 250 to about 500 pounds. In another embodiment, the pumping system 30 requires a vehicle weight-capacity for transport of the pumping system 30 of about 300 pounds.

The pumping system 30 includes a rotary power source 40, a continuously variable transmission (CVT) 60, and a pump 80. The rotary power source 40 provides power to operate the pump 80 via the CVT 60 (accordingly, source 40 is the prime mover of pumping system 30). The pumping system 30 further comprises an intake conduit 82 having an inlet 81 with an intake filter 120 that is in fluid communication therewith as provided by a sealed engagement thereto. The opposite end of the intake conduit 82 is coupled in sealed engagement with an intake 92 as defined by an intake plate 96 (shown in FIG. 3 and FIG. 4), which draws water into the remainder of pump 80 (see, FIG. 2-4) from source W. Water intake from source W occurs when the pump 80 generates suction/lift through the intake filter 120 submerged in source W and the conduit 82 is in fluid communication with the filter 120. The pump 80 pressurizes water for output through an outlet 94 that is in fluid communication with an output conduit 84. The source W may be a natural body of water, such as a river, lake, pond, an aquifer and the like or the source W may be an artificial enclosure that is holding water such as a retaining pond, a reservoir, a mine, a holding tank or the like. In other embodiment, the source W may be a holding tank on another vehicle, such as a truck, and the pumping system 30 may be employed without or without the mobile system 20.

Accordingly, the pumping system 30 is structured to convey/transfer water from the water source W to a selected destination for various desired purposes, including, but not limited to the mitigation of a hazardous conditions to persons and/or the environment, such as fighting the depicted wildfire F, among other things. The output conduit 84 may discharge water through a manifold 85 that terminates in a nozzle 86. One example of hydraulic head H for pump 80 is illustrated in FIG. 1 with respect to the elevational extension of output conduit 84. It should be appreciated that in other applications of the pumping system 30, the manifold 85 may be of a type that divides/splits water flow among multiple water hoses with or without separate nozzles. These hoses may be routed to different areas (not shown). Alternatively or additionally, the water output from the output conduit 84 may be directed to wet-down selected areas to provide a form of firebreak and/or otherwise retard/prevent the spread of fire.

Figure 2:
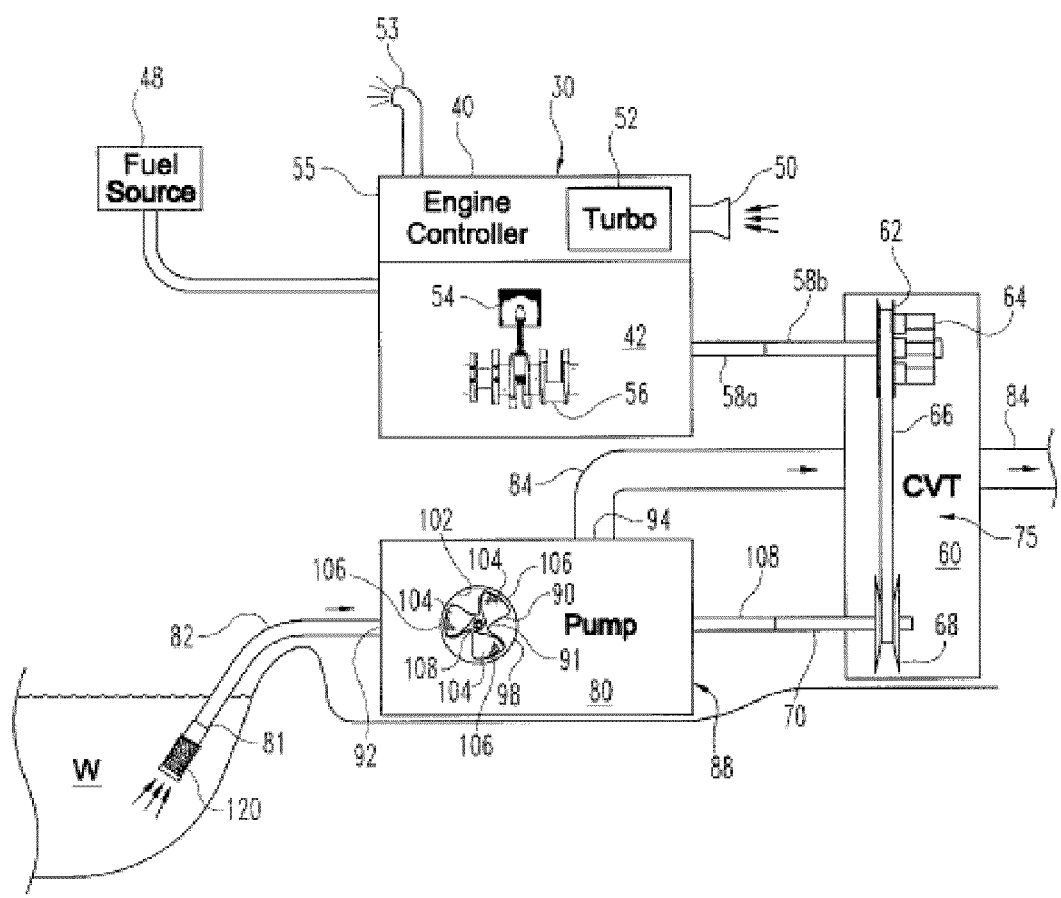
FIG. 2 is a schematic detailing aspects of the pumping system of FIG. 1.

Referring to FIG. 2, the pump 80 may also be configured to remove flood water from the water source W via the filter 120 that is in fluid communication with the intake conduit 82 at inlet 81; where like reference numerals refer to like features previously described.

The pumping system 30 pressurizes the water from source W for discharge through the output conduit 84 by rotating an axial flow impeller 90 of the pump 80. Such discharge is transported to a location away from the source W. In certain nonlimiting alternatives, the configuration of the pumping system 30 in FIG. 2 may also be directed to the exigent prevention of liquid spills—such as sewage and/or chemical waste spillage or overflow relative to a designated containment area. In still other nonlimiting alternatives, the pumping system 30 may be used for the transfer of liquids between various locations, for example, sewage between different ponds and/or routine irrigation applications (not shown).

Continuing to refer to both FIGS. 1 and 2, a rotary power source 40 is provided in the form of an internal combustion engine 42 as shall be further described hereinafter along with other aspects of the pumping system 30—but certain variations at the vehicle/system level are first considered. In some embodiments, the rotary power source 40 is structured to propel the vehicle 22 as well as the power pump 80 via a CVT 60—in which case the engine 28 may be absent, adapted to work in concert with the source 40 and/or otherwise. In a complementary fashion, still other alternative embodiments structures engine 28 of FWD subsystem 24 to both propel vehicle 22 and power pump 80—in which case, rotary power source 40 may be eliminated, adapted to work in concert with engine 28 for vehicle propulsion or pump operation, and/or differently applied. In still another embodiment, as described above a suitable watercraft may carry the pumping system 30 on a body of water that may offer a preferred way to reach certain wildfires F rather than traveling overland. Such body of water may also provide a ready water source W (not shown). In yet another embodiment, the pumping system 30 may be transported at least partway by air to the shore area of a selected lake, pond, pool, stream, or river, and suitably positioned to address wildfire F or other hazardous condition(s). Air transport may take place by suitable fixed wing float planes, other fixed wing aircraft, and/or rotary wing aircraft (e.g. helicopters) (not shown).

Rotary power source 40, and more particularly engine 42, provides mechanical power with a rotating shaft 58a turning at speed "n" typically designated in units of Revolutions-Per-Minute (RPM). In certain embodiments, a CVT power input shaft 58b is mechanically coupled to the shaft 58a of engine 42 in a one-to-one (1:1) turn ratio relationship by direct connection of the two. For such direct 1:1 connection, shafts 58a and 58b may be joined by splining, a keyway/key joint, sleeve coupler, flange coupling, clamp/split-muff coupling, or such other manner as would be known to those of ordinary skill in the art. Alternatively, a turn ratio other than 1:1 may be provided by a mechanical linkage between shafts 58a and 58b (not shown). Such linkage may be comprised of different diameter, meshed spur-gears, different diameter pulleys with an endless loop around them to transfer mechanical power therebetween, a torque converter, or the like (not shown).

Engine 42 includes multiple reciprocating pistons 54 (only one of which is symbolically shown in FIG. 2) coupled to a turn crankshaft 56. In correspondence, the crankshaft 56 turns to provide rotary power to a power output shaft 58a. The engine 42 may be an internal-combustion type with intermittent combustion of an air/fuel charge in each of a number of cylinders. More particularly, the depicted engine 42 is a multiple cylinder/piston type (typically six or more cylinders/pistons), four-stroke (four-cycle), spark-ignition (SI), gasoline fuel-injected type with multi-valve design. The engine 42 is supplied with combustible fuel from a fuel source 48. The engine 42 receives intake air through an air intake 50 to blend with fuel to provide a combustible air/fuel charge. Optionally, the engine 42 further includes a turbocharger 52 that is structured to apply boost pressure to intake air-particularly increasing the presence/density of oxygen available to mix with the fuel to form the air/fuel charge with relatively greater energy content—and correspondingly increase engine combustion performance.

A four-stroke operation of engine 42 is next briefly described. During the first stroke, piston 54 moves downward in the cylinder to draw compressed air from turbocharger 52 through one or more open intake valves and into the cylinder. Concurrently, fuel is injected by port and/or direct injection into the cylinder to mix with the compressed air, resulting in selected air/fuel mixture characteristics. The fuel injection timing may follow a specified profile relative to the downward intake stroke (first stroke) and/or the subsequent second stroke (compression stroke). During the compression stroke, all cylinder valves are typically closed (not shown), trapping the air/fuel mixture in the cylinder, and piston 54 moves upward to further compress this mixture. The resulting combustible charge is fully formed by completion of the compression stroke at or near top dead center of the second stroke. The compressed charge is then spark ignited to convert chemical energy of the charge to mechanical energy through the chemical reaction of combustion. This combustion results in expanding gases that push against piston 54, forcing it downward during the third stroke, which is referred to as a power stroke. During the power stroke, piston 54 moves downward through cylinder until it reaches bottom dead center. As the power stroke occurs, all valves are closed and the effective volume of the cylinder expands, containing the combustion products (exhaust). This exhaust is pushed out of the cylinder through one or more opened exhaust valves during the fourth and final stroke, an upward exhaust stroke. These four strokes are then repeated in each cylinder to rotate the crankshaft 56 and correspondingly turn the shaft 58a with the objective of achieving a steady state operation at a rotational engine speed (n).

The exhaust is collected from engine 42 through an exhaust manifold (not shown) that is discharged through engine exhaust outlet 53. The collected exhaust may travel through a catalytic converter and/or muffler device (not shown) before exiting through outlet 53. In the depicted embodiment, engine coolant circulates through one or more engine cooling jackets (not shown). Such jackets are typically formed in the engine block and cylinder heads, which are interconnected through certain passages. During operation of the engine 42, the circulating water is warmed, removing heat from desired portions/components of the engine 42. Because turbocharging typically increases the temperature of the boosted, pressurized input air, the turbocharger 52 may include an intercooler/heat exchanger (not shown) through which the coolant is also circulated. Heat is removed from the circulating coolant with a radiator that may include a cooling fan and/or other heat exchanger(s) (not shown). In addition to or in lieu of the use of a radiator, an external water source may be used to exclusively provide or supplement engine cooling (not shown).

For the internal combustion engine 42, the operating point/range is often targeted relative to a particular engine speed range-designated as the engine powerband. Typically, the engine powerband is specific to the engine design and various operating parameters thereof (such parameters including but not limited to: fuel quality, intake air constitution, ambient temperature/humidity, coolant/lubrication effectivity, engine wear, and/or certain maintenance factors, or the like). Certain engine speeds n are often of particular interest: (a) speed n corresponding to the best engine efficiency designated as BEpeak (n=BEpeak), (b) speed n corresponding to greatest output torque designated as Qpeak (n=Qpeak), and (c) speed n corresponding to the greatest output power that is typically expressed as brake horsepower and designated as BHpeak (n=BHpeak) herein. It is not unusual for each of these three rotational speeds to differ from one another (BEpeak≠Qpeak≠BHpeak). Commonly, the engine powerband encompasses all three of these speeds with Qpeak and BHpeak being at or near the minimum and maximum extremes of the powerband, respectively, for a typical multiple cylinder, four-stroke engine designs that use common commercially available fuels. Likewise, for such designs, BEpeak is often somewhere in between Qpeak and BHpeak (i.e. Qpeak 5 BEpeak BHpeak). Indeed, the engine powerband is often defined with Qpeak at or near its minimum and BHpeak at or near its maximum (i.e. engine powerband Qpeak n 5 BHpeak). In some racing cars, a powerband in excess of 14,000 RPM is not unusual. In a more typical engine design dedicated to sustained operation of pump 80 via CVT 60, the powerband may extend from about 8700 RPM through about 10,800 RPM (Qpeak=8700 RPM 5 n 5 10,800 RPM=BHpeak); and the target steady state operating point is set to about the peak output brake horsepower, BHpeak=n=10,800 RPM. These parameters may be associated with a four-stroke, multi-valve, turbocharged SI engine type that uses common gasoline and has heavy-duty cooling. In another gasoline-fueled example of similar design, a flat Qpeak range is established: 3500<Qpeak<6000 RPM with a more "peaked" BHpeak=7000 RPM. It should also be appreciated that engine designs and performance parameters can be adjusted to some extent to provide one or more wider, flatter engine powerband parameters or to provide for a more pronounced higher peak of one or more powerband parameters. For roadworthy diesel-fueled engines, powerbands are generally lower and the peaks more pronounced compared to gasoline-fueled engines. For one typical diesel example 1500 RPM<Qpeak<2000 RPM and 3500 RPM<BHpeak<4500 RPM.

Engine 42 further includes an engine controller 55 that is adjustable to determine an acceptable steady state target speed n (such as BHpeak) and that regulates various operating parameters such as engine fueling, ignition timing, and the like to keep speed n at or near its target steady state operating point (speed). This operating point is selectable with the controller 55. In one embodiment, the controller 55 is a standard type of electronic Engine Control Module (ECM). While the controller 55 regulates the engine 42 relative to its target operating point, engine load changes (i.e. load transients) could potentially vary engine speed n to a significant degree before the controller 55 returns engine 42 to steady state operation. Transient recovery may be improved by using a number of techniques such as negative feedback, feed-forward control, load change prediction, prognostics, load sensing/monitoring, and the like. Also, performance can improve if equipment external to the engine 42 and the controller 55 responds to a load transient by limiting the magnitude and/or duration effectively realized by the engine 42 and/or the controller 55. Among other things, the CVT 60 may compensate for transients as more fully described below.

The CVT 60, which may also be referred to as a single speed transmission, a stepless transmission or a pulley transmission allows for a transition through a range of gear ratios between a rotational output, for example from the engine 42, and the rotational input of the pump 80. In one embodiment, the CVT 60 uses the rotational output from the engine 42 to provide a variable output speed and torque to the pump 80. In one embodiment, the CVT 60 is a variable-diameter pulley, which may also be referred to as a Reeves drive. In this embodiment, the CVT 60 includes a variable width pulley 62 that is fixed to rotate with the CVT power input shaft 58*b*, and a variable width pulley 68 is fixed to rotate a CVT power output shaft 70. An endless loop 66 fits about both pulleys 62 and 68, frictionally engaging each so that as the pulley 62 turns, the endless loop 66 rotates about both pulleys 62 and 68, driving rotation of the pulley 68 and the CVT power output shaft 70 fixed thereto. The endless loop 66 is formed from a belt 67 that fits about the pulleys 62 and 68 and frictionally engages each one. The CVT 60 also includes a CVT drive mechanism 75 to govern the width presented by pulleys 62 and 68. For certain embodiments, it should be appreciated that pulley width variation causes the pulley's effective diameter to change. In one embodiment, the distance between the two pulleys 62 and 68 does not materially change during operation of the pumping system 30 but the effective diameters of the two pulleys 62 and 68 may change at substantially the same time to change a gear ratio between the two pulleys 62 and 68. In one such embodiment, the effective diameter of one or both of the pulleys 62, 68 decreases with an increasing width. Accordingly, adjusting the pulleys 62 and 68 to different widths corresponds to different effective diameters and the turn ratio (TR) between the CVT power input shaft 58*b* and the CVT power output shaft 70 can be varied over a selected range. In FIG. 2, the CVT drive mechanism 75 includes a width control mechanism 64 connected to the pulley 62, while a width control mechanism 68*d* for the pulley 68 is not shown except in FIG. 5, FIG. 9, and FIG. 11 to be discussed later. The absence of the width control mechanism 68*d* results because it is not visible in an assembled top view like that in FIG. 2, FIG. 8, and FIG. 10 and depiction of the width control mechanism 68*d* in phantom or schematically in these figures would obscure other features. As will be appreciated by those skilled in the art, the CVT 60 may be employed in other forms.

Figure 4:
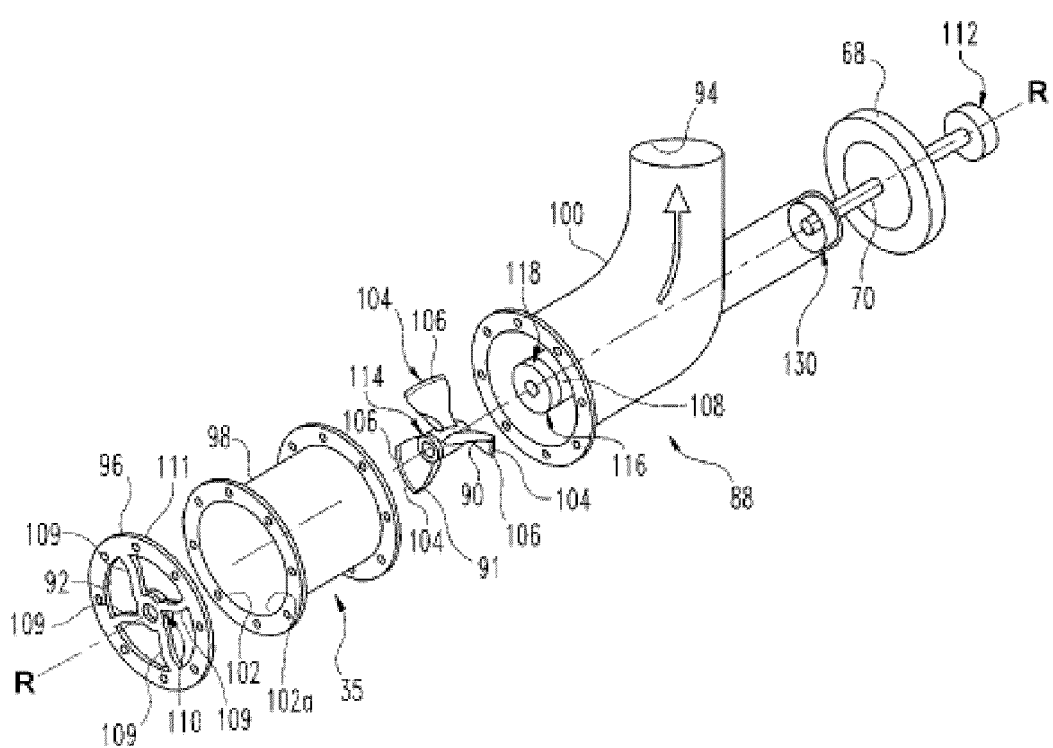
FIG. 4 is a partially-exploded isometric view of a portion of one embodiment of the pumping system of FIG. 3.

The CVT power output shaft 70 is mechanically coupled to an impeller shaft 108 of pump 80 (FIG. 4). The impeller 90 is fixed to the shaft 108 to rotate therewith at a rotational speed p. This mechanical coupling of the shafts 70 and 108 may be a direct connection with a one-to-one (1:1) turn ratio. As in the case of the shafts 58*a* and 58*b*, the shafts 108 and 70 may be joined to form this direct connection by splining, a keyway/key joint, sleeve coupler, flange coupling, clamp/split-muff coupling, or such other manner as would be known to those of ordinary skill in the art. Alternatively a different turn ratio may be provided in other embodiments by a coupling linkage between the shafts 70 and 108. In certain further refinements, this linkage may take the form of meshed spur gears of different diameters, pulleys of different diameters linked by an endless loop, a torque converter, or the like (not shown). Consequently, the CVT 60 mechanically connects engine 42 to pump 80 to supply rotary power thereto subject to a variable turn ratio TR over a selected range. The variation of turn ratio TR is regulated by the CVT drive mechanism 75 to maintain the rotational output engine speed n at or near a steady state target operating point. The regulation of engine speed n takes priority over other operating parameters, such as those associated with operation of the pump 80. The CVT 60 generally provides for this priority as will be more fully described in text accompanying FIG. 5 through FIG. 11.

Figure 3:
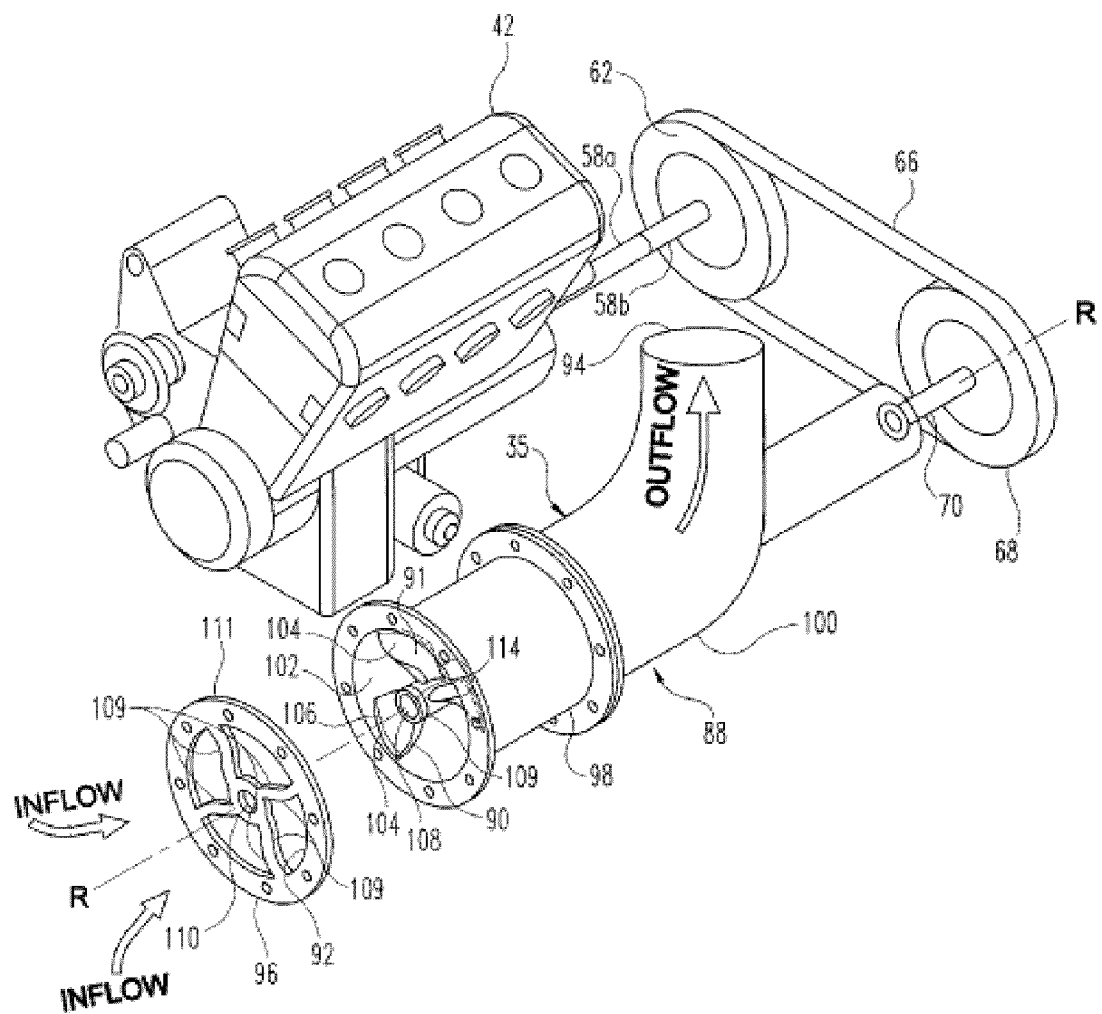
FIG. 3 is a partially-exploded isometric view of certain details of the pumping system of FIG. 1.

With reference to FIG. 2, FIG. 3 and FIG. 4, the impeller 90 may, for example, be a tri-vane (or tri-blade) axial flow type (shown in schematic form in FIG. 2). With this form of a kinetic pump rotor 91, the pump 80 is alternatively designated a type of rotodynamic pump 88 (previously defined). Pump 80 is comprised of a pump housing 35 (see FIG. 3 and FIG. 4). The housing 35 includes constituent housing parts, such as a plate 96, a housing 98, and an elbow 100 to be further described hereinafter. The housing 98 has an interior surface 102 in the general shape of a right circular cylinder that contains the impeller 90 (see FIG. 3 and FIG. 4). The surface 102 defines the margin of a rotor passage 102*a* through the housing 98. The impeller 90 may form a seal 104 at an impeller outer leading edge 106 and the surface 102, which may be caused by a nonferrous, self-lubricious seal 104 that is present along each outer leading edge 106 of the impeller 90 that is mechanically arranged to moves outward with impeller 90 rotation such that it meets inner surface 102 of housing 98. This may provide a type of variable geometry blade. In certain embodiments, the seal 104 along outer leading edge 106 of impeller 90 forms a tight clearance with surface 102 that can improve impeller performance and correspondingly pump 80 efficiency. Typically, the self-lubricious, nonferrous material comprising seal 104 is selected to be harder than ferrous-based alloys and to be less subject to abrasion and wear. Alternatively, the seal 104 comprises a polymer-based material. Nonetheless, it is recognized that replacement of seal 104 and correspondingly impeller 90 may be desired from time-to-time to maintain desired performance/efficiency enjoyed by mating seal 104 to surface 102. Even so, the variable-geometry of impeller 90 decreases the need for such replacement and does not necessarily result in the desire to replace housing 98 with the same frequency due to concomitant wear rates.

Specific to FIG. 3, the pump 80 is shown in a partially diagrammatic, perspective view that is in an assembled form except for an intake plate 96, which is shown in an exploded view (see FIG. 4) to better illustrate features of the impeller 90 relative to the housing 98 in which the impeller 90 resides; while the engine 42 and the CVT 60 are shown in a schematic form to preserve clarity. Specific to FIG. 4, the pump 80 is shown in more detail with the pulley 68 of the CVT 60 in a more fully exploded view with certain aspects being schematically depicted so as not to detract from certain details. As shown in both FIG. 3 and FIG. 4, the intake 92 is further defined by one or more flow guide ribs 109 that extend from an outer circumferential ring 111 to coaxially locate a plate bearing/seal 110 along the rotational axis R-R of the shaft 108. When assembled, the bearing/seal 110 slides over the impeller bearing/seal 114 within the housing 98 near the intake 92, providing a journal bearing with a seal that prevents water from reaching the main impeller shaft 108 at the upstream end of the impeller 90. As specifically labeled in FIG. 4, the downstream end of the impeller 90 slides over the bearing 116, engaging an O-ring friction seal 118 when assembled within the housing 98. Accordingly, water is also prevented from reaching the main impeller shaft 108 through this route. The shaft 108 extends through a portion of an output elbow 100 along rotational axis R-R to engage the CVT power output shaft 70 at the bearing 130. The shaft 70 extends through the variable width pulley 68 to engage the CVT support bearing 112 (shown in FIG. 4 only). The pulley 68, the CVT output power shaft 70, the impeller shaft 108, and the impeller 90 all rotate together about the rotational axis R-R when driven by the endless loop 66 (loop 66 is not shown in FIG. 4 to preserve clarity). Correspondingly, the intake plate 96, the axial impeller pump housing 98, and the pump output elbow 100 are all joined together by fasteners (such as bolts) with appropriate gaskets, washers, O-rings or other sealing mechanisms therebetween to prevent water loss through the corresponding connections.

Figure 5:
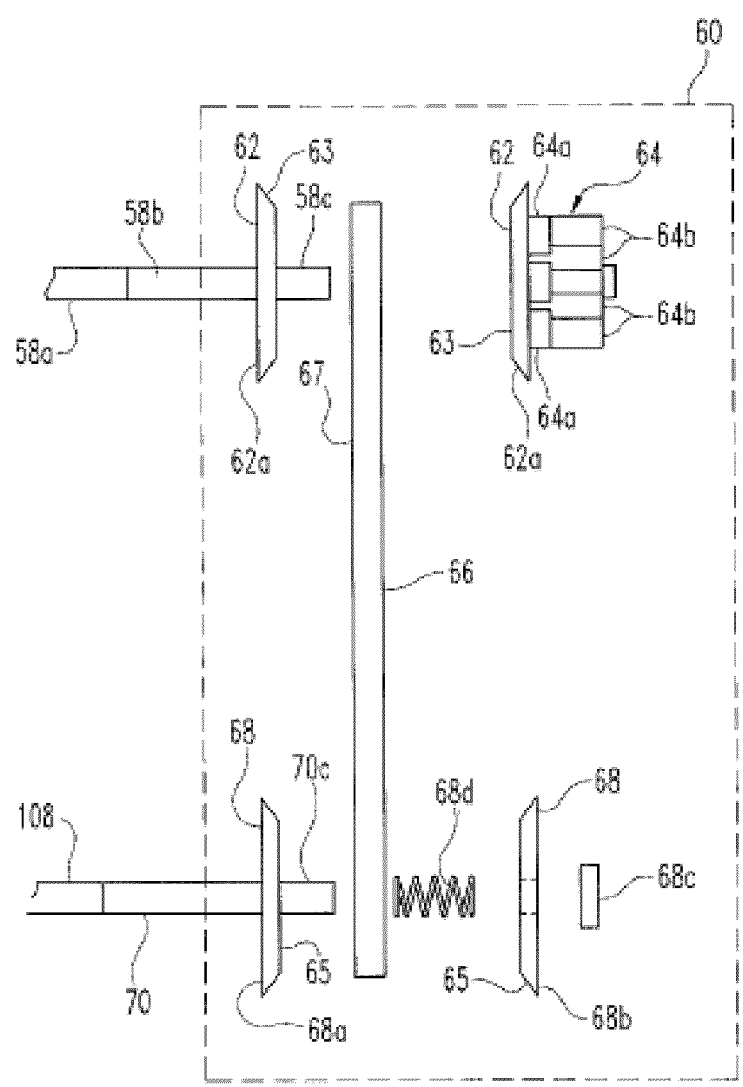
FIG. 5 is an exploded elevation view of selected components of an example CVT of the pumping system of FIG. 1 that details fixed and variable pulleys for a drive pulley and a driven pulley.
Figure 8:
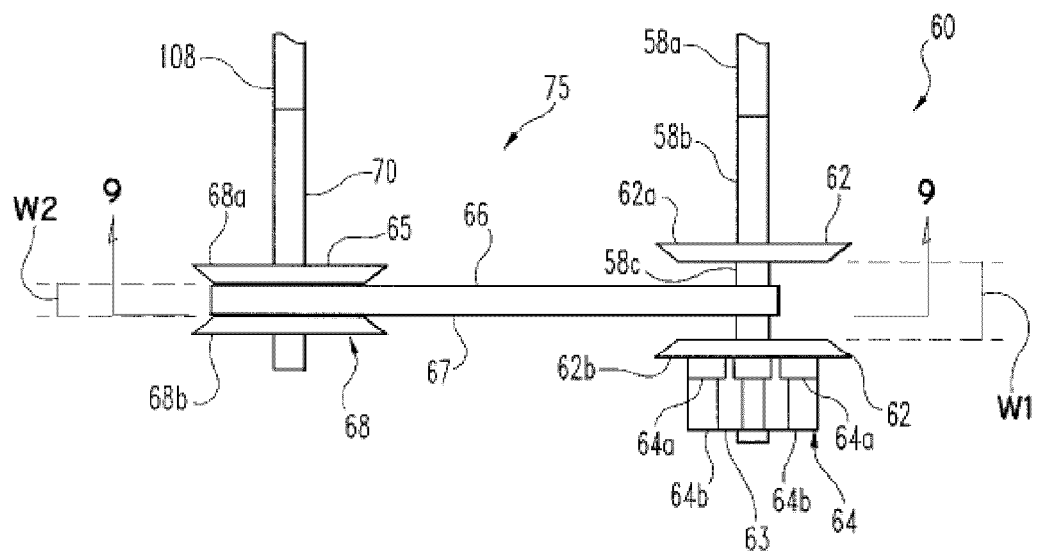
FIG. 8 is a top plan view of the CVT shown in FIG. 5.
Figure 9:
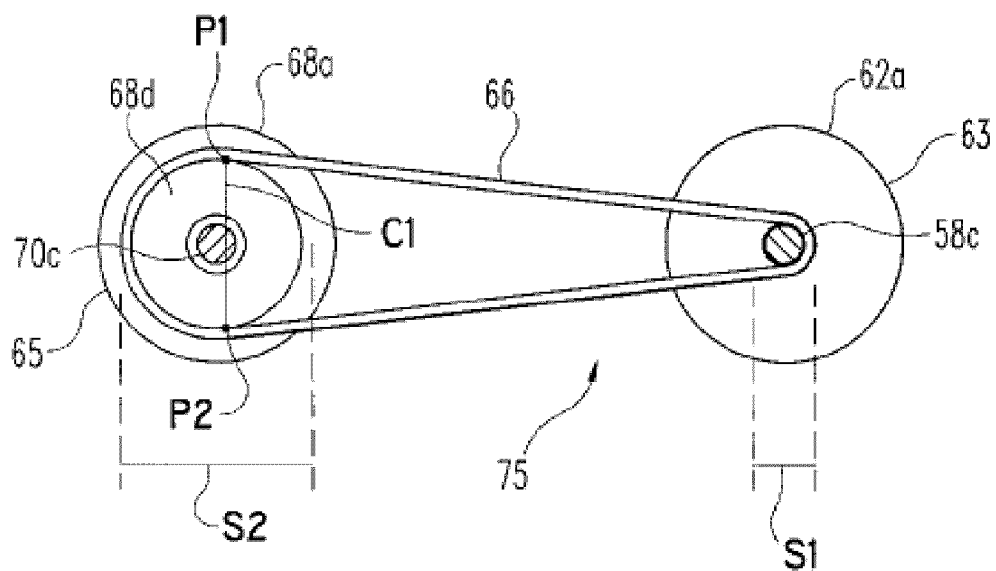
FIG. 9 is an elevation view of the CVT shown in FIG. 8 taken along line 9-9 in FIG. 8 with the CVT in a configuration for a stopped-through-idle speed operation of the CVT as configured with variable width drive and driven pulleys having a turning ratio of four to one for (drive:driven=4:1) (i.e. four turns of the drive pulley provides just one turn of the driven pulley)
Figure 10:
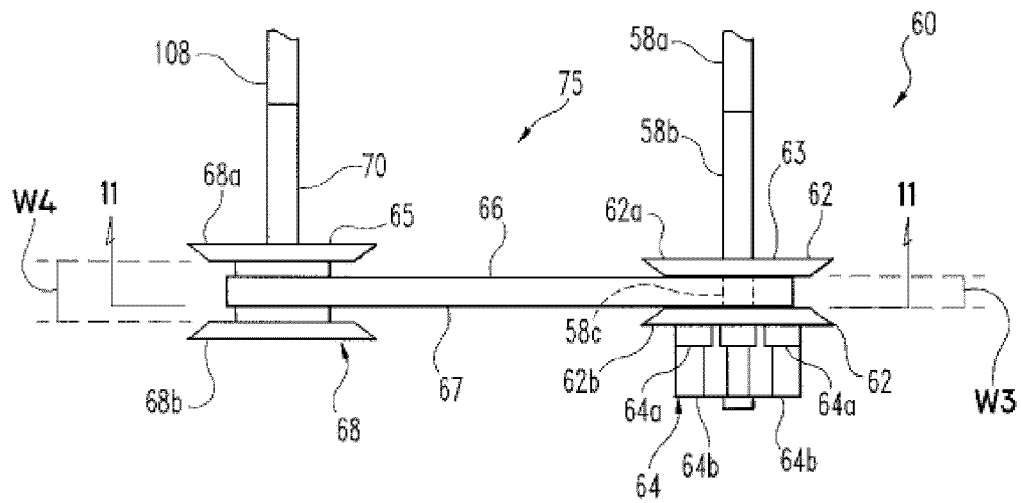
FIG. 10 is the same view as FIG. 8 but FIG. 10 corresponds to a configuration for a steady-state speed operation of the CVT as configured with variable width drive and driven pulleys having a turning ratio of one to one (drive:driven=1:1)(i.e. driven pulley turns once for each turn of the drive pulley)
Figure 11:
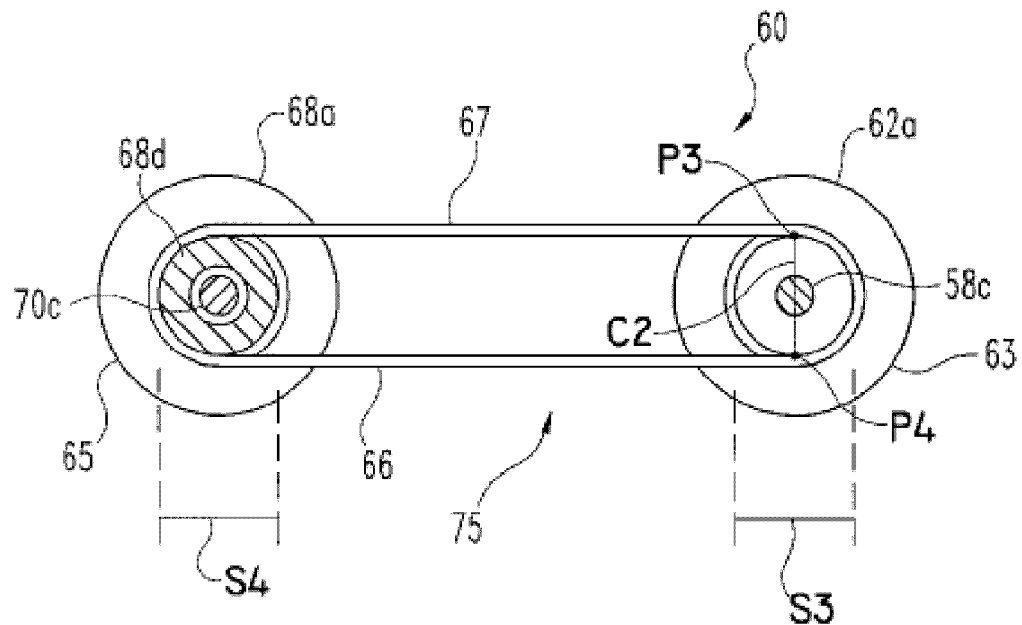
FIG. 11 is the same view as FIG. 9 taken along line 11-11 in FIG. 10.

During operation, as the impeller 90 (a form of kinetic pump rotor 91) turns about the rotational axis R-R, it receives water through the intake 92 of the plate 96 and pressurizes the water with a primary velocity component approximately parallel to the rotational axis R-R as it exits the impeller 90. As a form of a rotodynamic pump 88, kinetic energy is also stored as potential energy in the form of pressure in housing 98. Soon after exiting the impeller 90, the pressurized water is turned by the elbow 100 away from axis R-R to exit through an elbow outlet 94 generally perpendicular thereto. The elbow outlet 94 has a cross-section that is less, or smaller, than that defined by housing 98 or provided at the input to elbow 100. This decrease in cross-sectional area correspondingly increases water flow velocity as it exits elbow outlet 94 at the expense of converting a corresponding amount of potential energy in the form of pressure to kinetic energy. The increase in kinetic energy is in the form of increased water flow velocity. As best shown in FIG. 1 and FIG. 2, the pump output conduit 84 is in sealed engagement with the elbow outlet 94 to direct the water flow in a desired manner. During steady state operation of engine 42 at speed n, load transience typically occurs with a non-negligible change in head H of pump 80. This change in head H causes rotational speed p of impeller 90 to change along with shaft 70 coupled thereto. A non-negligible increase in head H results in an increase in the effective weight of water bearing down on impeller 90 pushing against it to cause rotational speed p to slow, which imposes an increase in mechanical resistance realized by the CVT 60. In contrast, a non-negligible decrease in head H reduces loading on the impeller 90 and correspondingly the CVT 60. FIG. 5 provides a partially diagrammatic, exploded view of the CVT 60. FIG. 8 and FIG. 9 provide partially diagrammatic top and side views of the CVT 60, respectively, for one exemplary turn ratio, and FIG. 10 and FIG. 11 provide partially diagrammatic top and side views of the CVT 60, respectively, for another exemplary turn ratio; where like reference numbers refer to like features. It should be understood that section line 9-9 shown in the top view of FIG. 8 corresponds to the side view of FIG. 9; and section line 11-11 shown in the top view of FIG. 10 corresponds to the side view of FIG. 11.

The CVT drive mechanism 75 may respond to a mechanical resistance change from a transient by adjusting width of the pulley 68, which also referred to herein a driven pulley 65, with a control mechanism 68d that changes the turn ratio TR. The control mechanism 68d may be in the form of a helical/coil spring positioned about an end portion 70c of the shaft 70. Correspondingly, a control mechanism 64 responds to an initial speed change in the rotational speed of shaft 58b to adjust the width of pulley 62, which is also referred to as a drive pulley 63, to the extent that any speed change of shaft 70 is transferred through loop 66 to shaft 58b. For some minor transients, it is possible that such transients may be sufficiently addressed by adjustment of the control mechanism 68d without a noticeable change caused by the control mechanism 64; however, for more significant transients, the change in effective diameter of driven pulley 65 as caused by control mechanism 68d likely will result in a width adjustment of drive pulley 63 by control mechanism 64 changing its effective diameter. In turn, further refinement in the effective diameter of the driven pulley 65 by the mechanism 68d may occur as a result of the change to the pulley 63 as it is "communicated" by the loop 66. This back-and-forth refinement may continue for a few iterations, tending to quickly stabilize without significant risk of persistent oscillation, ringing, or otherwise being unresolvable. With these adjustments by the CVT drive mechanism 75, the operating point engine speed is quickly recovered to the extent there is even a noticeable deviation from the steady state target n.

While engine speed n tends to remain at or near the steady state target operating point as head H significantly fluctuates, there may be a trade off because the adjustment of the CVT drive mechanism 75 in response to head H fluctuation, changes impeller 90 rotational speed p. This variation in impeller 90 speed p causes water capacity output from the pump 80 to correspondingly fluctuate. Under steady state conditions, the CVT drive mechanism 75 provides a drive pulley 63 to driven pulley 65 turn ratio (drive:driven=Turn Ratio=TR) that changes along with speed p. Consequently, among the control laws of pumping system 30, are that maintenance of a steady state engine speed n takes priority over steady state provision of water capacity of pump 80 when adjustments of head H result in transients and/or load changes. Accordingly, the CVT 60 turn ratio TR is varied to maintain a steady state target engine speed n by responding to changes to resistance/loading from pump 80 with dynamic turn ratio changes that may be continuously variable as needed to adjust to changing conditions of pump 80 (such as head H).

With reference to FIG. 2 through FIG. 5 and FIG. 8 through FIG. 11 collectively, the variable width pulley 62 includes a sheave portion 62a fixed to the shaft 58b and a moveable sheave portion 62b. The moveable sheave portion 62b translates along an end portion 58c of the shaft 58b relative to the sheave portion 62a under certain conditions. FIG. 8 depicts a pulley width W1 that is greater than a pulley width W3 depicted in FIG. 10. As the variable width pulley 62 is turned by the shafts 58a, 58b it receives rotary mechanical power (torque) from the engine 42 and accordingly is a form of the drive pulley 63. The variable width pulley 62 is mechanically linked by the endless loop 66 to the variable width pulley 68. As a result, the variable width pulley 68 turns in response to the drive pulley 63 via loop 66 making it a form of a driven pulley 65 where the pulley 65 is driven by drive pulley 63. The endless loop 66 may or may not include inward teeth, kerf, tapering, and/or surface roughening, like spikes, grit coating, or the like to assist with frictional engagement. Additionally or alternatively, the pulleys 62, 68 may include surface features to promote frictional engagement with the endless loop 66 such as teeth of either an intermeshing or non-meshed variety, tapering, surface roughening, like surface spikes, grit coating, or the like.

The variable width pulley 68 includes a sheave portion 68a fixed to the shaft 70 and a sheave portion 68b, which moves in translation relative to the sheave portion 68a along an end portion 70c of the shaft 70 under certain conditions. Because the shaft 70 is mechanically fixed to the shaft 108, which turns the impeller 90, the sheave portion 68a, the shaft 70, the shaft 108, and the impeller 90 all turn in concert at a pump rotational speed p that may differ from the engine rotational speed n of the power output of engine 42 (and input to pulley 62) depending on the turn ratio TR. The control mechanism 64 fixed to the sheave portion 62b of the pulley 62 to adjust a width of the pulley 62 along the end portion 58c in correspondence to speed n of the shaft 58a. The sheave portion 62b/control mechanism 64 moves apart from the sheave portion 62a in translation along the end portion 58c to increase the width of the pulley 62. As the width of the pulley 62 changes in response to the control mechanism 64 (compare pulley 62 width W1 in FIG. 9 to the pulley 62 width W3 in FIG. 11), so does the actual pulley diameter considering a circular pulley profile (compare the pulley 62 diameter S1 in FIG. 9 to the pulley 62 diameter S3), as well as the effective diameter (previously defined). Namely, the effective diameter of the pulley 62 is smaller when the pulley 68 is wider (width W1 FIG. 8) because the endless loop 66 is riding closer to shaft end portion 58c in the middle between sheave portions 62a and 62b (see FIG. 9); and the effective diameter about the pulley 62 is larger when the pulley 62 is narrower (width W3 FIG. 10) because the endless loop 66 is riding up the sheave portion(s) 62a and/or 62b (see FIG. 11). One example of the effective diameter as defined herein is a segment C2 extending between points P3 and P4. In this case, the segment C2 is close to if not collinear with a diameter intersecting a rotational axis of the pulley 62 and opposing points of contact P3, P4 of the circular section shown in FIG. 11.

One embodiment of the control mechanism 64 is comprised of clutch weights 64b (schematically depicted) that are pivotally connected to pins that are fixed to control mechanism 64. These weights 64b spin outward with increasing shaft 58b rotation at speed n. As the weights 64b spin outward, they cause rollers 64a (schematically depicted) to move along the end portion 58c to advance the sheave portion 62b towards the sheave portion 62a, and correspondingly decrease the width of the pulley 62 and increasing the diameter of the pulley 62. In addition, the arrangement of the control mechanism 64 typically includes one or more internal springs (not shown) coupled to the weights 64b to impose a force that must be overcome before weights 64b can move outward, and so maintains the minimum diameter of pulley 62 while turning from zero (0) to an idle speed determined with the springs. The spring(s) (not shown) may also assist in returning the pulley 62 to its minimum diameter at idle speed and maintaining that diameter when rotation stops or even when the engine 42 stops immediately with no controlled speed decrease down to idle first. Furthermore, weights 64b and the configuration of the control mechanism 64 otherwise are arranged to match and effectively provide a corresponding maximum rotational speed n of shaft (portions) 58a, 58b, and 58c corresponding to the desired steady state desired operating point speed of the engine 42. This operating point speed may correspond to the peak torque (Qpeak), the peak brake horsepower (BHpeak), or the peak efficiency (BEpeak). To maximize the pump 80 performance, the brake horsepower peak output rotational speed of the engine 42 serves as the selected operating point (BHpeak) with the corresponding idle speed being set to 35%-40% of the operating point speed. In FIG. 8, the pulley 68 width W2 is illustrated, which in comparison is less than the pulley 68 width W4 shown in FIG. 10. The CVT drive mechanism 75 of CVT 60 includes a width control mechanism in the form of a helical coil spring 68d with a selected spring constant. The spring 68d is oriented about shaft end portion 70c and has one end connected to the sheave portion 68a and the opposite end fixed relative to the sheave portion 68b by a hub 68c that collectively limits the outer width range of the sheave portion 68b along the end portion 70c-applying a nominal spring force to pull the sheave portions 68a and 68b towards each other. The hub 68c is integral with and an alternative designation of support bearing 112 previously introduced (compare FIG. 4 and FIG. 5 and accompanying description). The width control mechanism spring 68d varies width of the pulley 68 translationally along the shaft end portion 70c by controlling separation of the sheave portion 68b from the sheave portion 68a as a function of speed; where width/sheave separation increases with rotational speed-just the opposite of width control mechanism 64 operation that increase pulley width with rotational speed. Namely, width control mechanism spring 68d maintains sheave portions 68a and 68b close together in a narrow orientation (width W2 in FIG. 8) in accord with a corresponding spring force/spring constant. This configuration applies to the stopped through idle rotational speed of FIG. 8. As rotary speed of the shaft end portion 70c increases past idle, the spring force (as determined at least in part by the spring constant) of the width control mechanism spring 68d starts to be overcome so that the rotational energy of the shaft 70 causes the width control mechanism spring 68d to be pulled with a force sufficient to move the sheave portion 68b away from the sheave portion 68a. Resulting separation of the sheave portions 68a and 68b may be up to and perhaps beyond, a steady state rotational speed of the shaft 70 as represented in FIG. 10 by width W4. Conversely, the width control mechanism spring 68d is configured to pull sheave portion 68b towards the sheave portion 68a as the rotation slows to return to the narrow, stopped/idle configuration. In addition, as the width of the pulley 62 changes in response to the width control mechanism spring 68d; the actual diameter of the pulley 68 changes (compare S2 of FIGS. 9 to S4 of FIG. 11); and the effective diameter of the pulley 68 changes. In FIG. 9, an effective diameter of the pulley 68 with the endless loop 66 engaged thereto is the segment/chord C1 shown between endpoints P1 and P2; where CI is oriented, and P1 and P2 are selected based on the definition of the effective diameter. Notably, the effective diameter about the pulley 68 is larger when the pulley 68 is narrower because the endless loop 66 is riding up on the sheave portion 68a and/or sheave portion 68b as depicted in FIG. 9. In contrast, the effective diameter is smaller when the pulley 68 is wider (width W4 FIG. 10) because the endless loop 66 is positioned closer to the shaft end portion 70c and is generally more closely centered relative to the distance between the sheave portions 68a and 68b. In contrast, the effective diameter defined with the pulley 68 is larger when the pulley 68 is narrower (i.e. width W2 of FIG. 8) because the endless loop 66 is positioned farther away from the shaft end portion 70c. The variable width pulley control mechanism 64 may be similar to a primary clutch, and width control mechanism spring 68d may correspond to a secondary clutch that together are sometimes utilized in CVTs of snowmobiles, All Terrain Vehicles (ATVs), side-by-sides (i.e. UTVs), smaller motor bikes/scooters, variable speed drill presses and rotary mills, certain golf carts, and one or more types of small/personal watercraft.

Correspondingly, the CVT 60 of the pumping system 30 can be described by changing turn ratio "TR" between the pulley 62 and the pulley 68 as the rotational speed of the shaft end portion 58c and the shaft end portion 70c change relative to each other past the stopped/idle configuration. Indeed, it should be appreciated that the arrangement of the control mechanism 64 and the mechanism spring 68d are aimed towards providing a generally constant TR (or perhaps only modestly changing) between a rotational speed of zero (0) where the rotary power source 40/engine 42 is not operating, up to the idle rotational speed. To better understand the usage of turn ratio TR in the present disclosure, consider the general case of a ratio of two real number variables A and C and the certain ways a ratio may be expressed. The ratio statement of "A to C" is equivalent to the mathematical fraction expression NC, which in turn is equivalent to the proportion representation of a ratio of the form A:C using a colon (:) operator. For the fractional form NB, A is the "numerator" term and B is the "denominator" term and equivalently, for the A:C proportion expression, the common mathematical terminology labels A as the "antecedent" term and B as the "consequent" term, (that is in ratio terms NC=numerator/denominator=A:C=antecedent:consequent). The proportion (colon) representation is typically used herein to express turn ratio TR. In some representations, one of the antecedent (A) or consequent (C) terms is expressed as one with the other being normalized, as appropriate, to provide the correct ratio expression. Regarding such forms, only the antecedent term A varies or consequent term C varies. With A being variable, TR=A:1=the variable A number of revolutions of the pulley 62 to 1 revolution of the pulley 68; where A E II8={Real Numbers} (A is a real number); and with B being variable, TR=1:B=one revolution of pulley 62 to the variable B number of revolutions of pulley 68; where B E LB. In one embodiment, the turn ratio TR is about 4:1 (A=4, B=1) for a speed of zero (engine 42 stopped) through approximately selected idle speed. A turn ratio TR of 4:1 (drive:driven) means drive pulley 63 rotates four (4) times for every single revolution of driven pulley 65. The turn ratio configuration of CVT 60 in FIG. 8 and FIG. 9 is representative of a turn ratio TR of 4:1. In contrast, the turn ratio configuration of CVT 60 in FIG. 10 and FIG. 11 is representative of a turn ratio TR of 1:1, which is appropriate for engine steady state operation at or near its selected operating point. A turn ratio TR of 1:1 (drive:driven) means drive pulley 63 turns once for every single revolution of driven pulley 65. In between these values, TR changes continuously in accordance with whether the speed is increasing or decreasing (1<A<4). As speed n increases above idle, the effective diameter of the pulley 62 increases in response to the width control mechanism 64 and the effective diameter of the pulley 68 decreases in response to the width control mechanism spring 68d, antecedent value A decreases (A<4) such that TR is between the proportion 1:1 and 4:1 (4:1>TR>1:1). The changing TR between 4:1 and 1:1 represents a continuous upshifting if A is decreasing or downshifting if A is increasing, that may be thought of in terms of various intermediate fixed gear ratios common to non-continuous transmissions based on gear ratios (such as simple manual transmissions). In one four gear analogy, first gear may be considered TR=4:1 and fourth gear may be considered TR=1:1, both of which have been previously introduced in terms of turn ratio TR. Considering these lower and upper extreme gear ratios (sometimes referred to in common parlance as just "gears"), common intermediate gears (gear ratios) second and third, are represented by the ratios 2.07:1 and 1.43:1, respectively—with the understanding that the CVT 60 operates on a continuous rather than fixed gear/gear ratio as provided in this comparison. As the effective diameter of the pulley 62 approaches its minimum and the pulley 68 approaches its maximum (A is equal to about 1), then turn ratio TR is equal to about 1:1. In some alternative embodiments, the range and/or endpoints of the turn ratio range TR differs from that described in connection with FIG. 5 and FIG. 8 through FIG. 11. Recognizing that a higher rotational pump speed p of 15,000 RPM or more may be realized under certain conditions, some implementations of pumping system 30, one alternative to a 1:1 upper/high end extreme of the turn ratio TR range is to adjust control mechanism 64 and/or control mechanism spring 68d (and/or dimensioning of certain aspects of the endless loop 66, the sheave portions 62a, 62b, 68a, 68b and/or the shaft end portions 58c and 70c) to allow an example maximum pump speed p of 15,000 RPM on the driven side (inclusive of driven pulley 65, shaft 70, shaft 108, and impeller 90) while maintaining the engine speed n target. Selecting an engine speed n target operating point of 11,000 RPM for the drive side, the resulting turn ratio TR of drive:driven=11,000:15,000=0.73:1=1:1.36 for this alternative. With this configuration, the shaft 70 turns 15,000 times for every 11,000 turns of the shaft 58b (or equivalently: 73% of a turn of the shaft 70 for every 1 turn of the shaft 58b or the shaft 70 turns once for every 1.36 turns of the shaft 58b). The governance of the pumping system 30 relative to turn ratio TR and various operational aspects of the pump 80 are described further in connection with FIG. 6 and FIG. 7 as follows.

Figure 6:
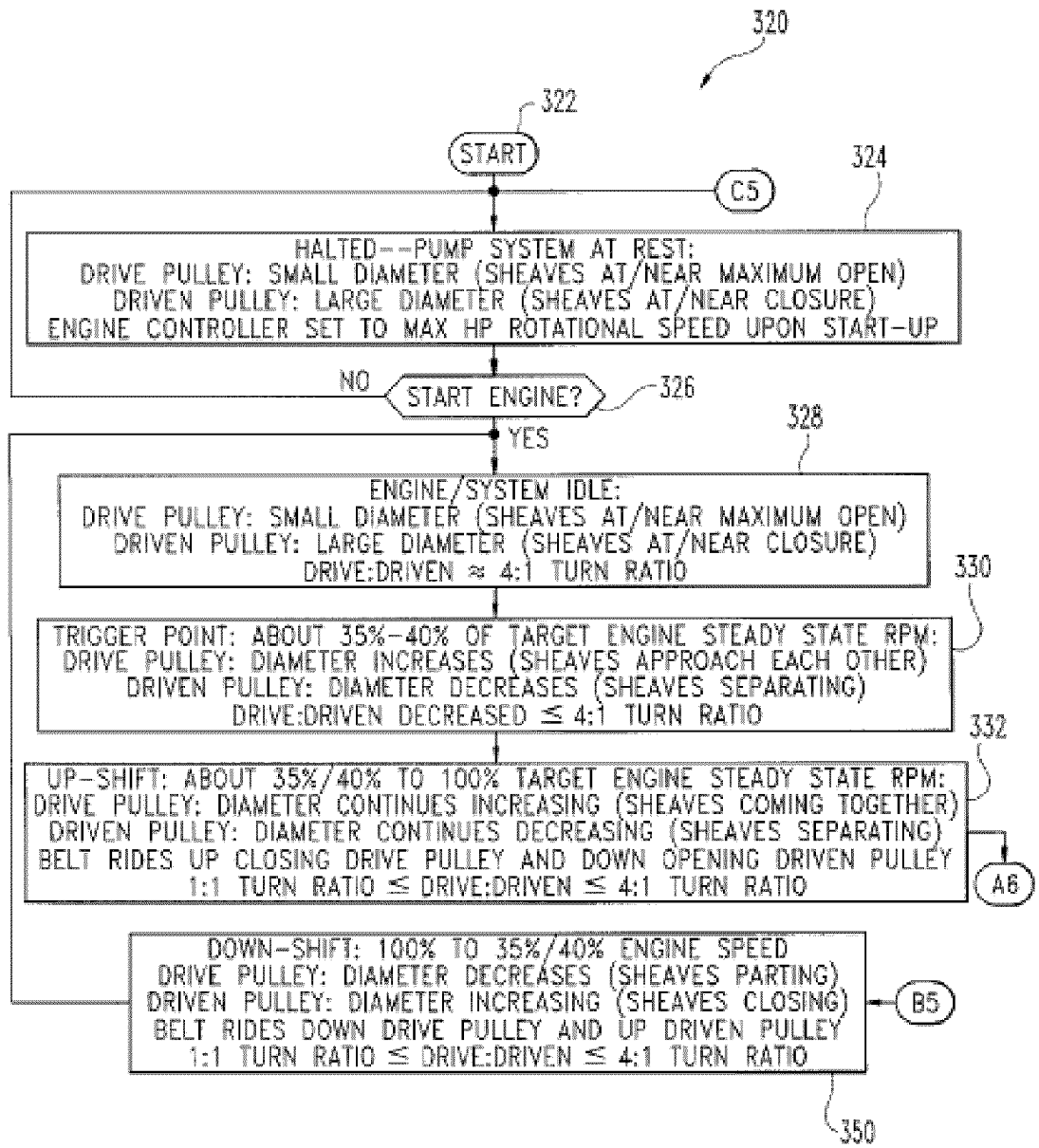
FIG. 6 depicts a flowchart directed to a first portion of a nonlimiting routine for operating the pumping system of FIG. 1.
Figure 7:
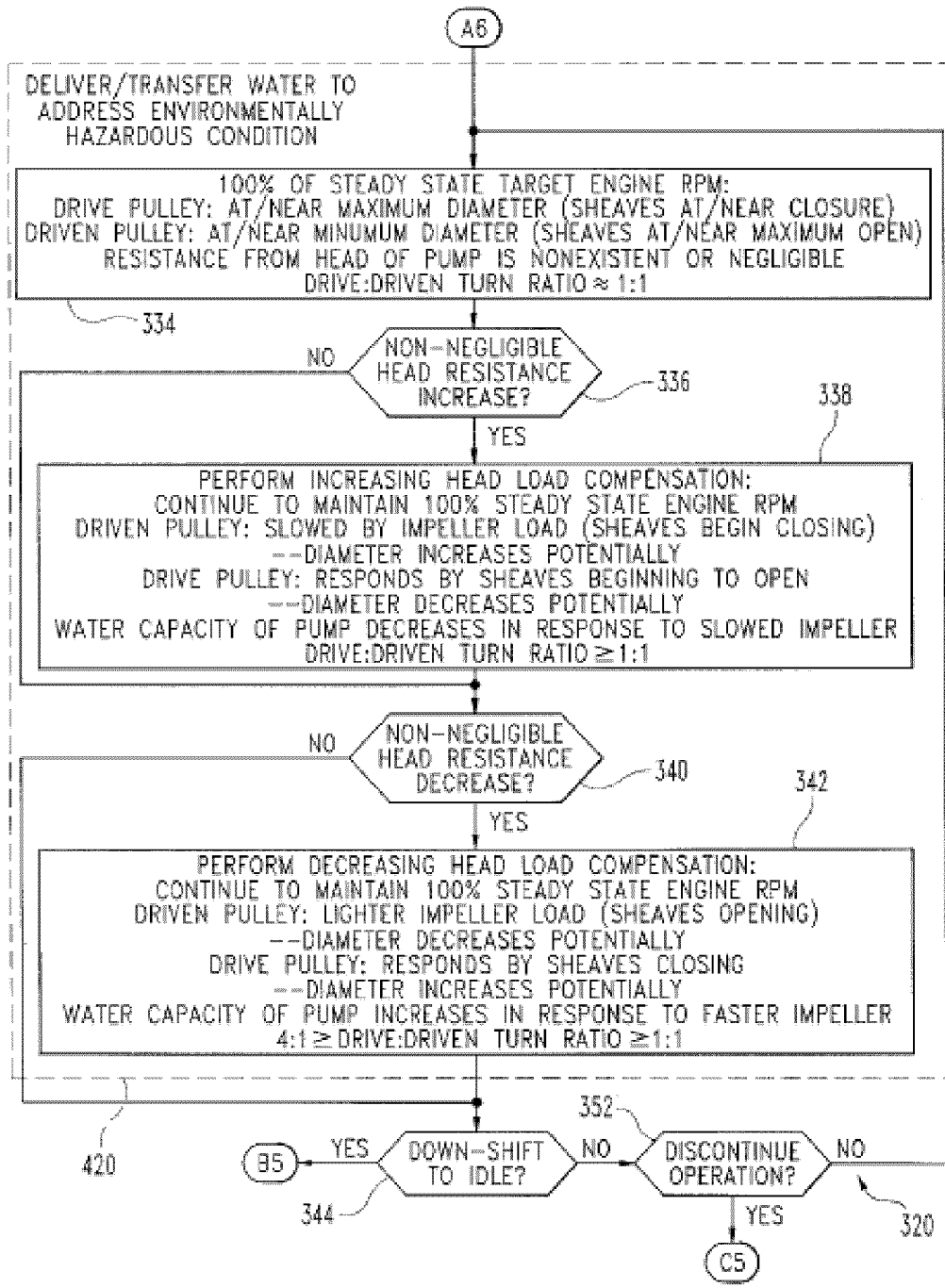
FIG. 7 depicts a flowchart directed to a second portion of a nonlimiting routine for operating the pumping system of FIG. 1.

Referring to FIG. 6 and FIG. 7 collectively depict a flowchart of the pumping system 30 operating routine 320; where like reference numerals refer to like features previously described. For the purposes of the operating routine 320, the power input variable width pulley 62 is alternatively designated drive pulley 63 from time-to-time and the power output variable width pulley 68 is alternatively designated the driven pulley 65 from time-to-time. Operating routine 320 begins with start stage 322 on FIG. 6. From start stage 322, operating routine 320 advances to engine stopped stage 324 (n=0) in which operation of the system 20 is halted and the pumping system 30 is at rest (p=0). In stage 324, the drive:driven pulley turn ratio is 4:1. Further, the drive pulley 63 has a small effective diameter with the sheave portions 62a and 62b being at or near maximum open. In addition, the driven pulley 65 has a large effective diameter with the sheave portions 68a and 68b at or near closure. Also, the engine controller 55 is configured to operate the engine 42 at an operating point corresponding to the peak brake horsepower (BHpeak) provided with engine 42. This halt configuration of stage 324 is typical when the vehicle 22 is parked or the pumping system 30 is being transported. In certain embodiments, transport during stage 324 includes significant off-road, rough terrain travel of 5 miles or more in order to reach a remote water source W. Fighting the wildfire includes applying water pumped from source W to flames F in the manner shown in FIG. 1 and described in accompanying text. In certain other embodiments, transport during stage 324 includes significant off-road, rough terrain travel of 5 miles or more in order to reach water source W to abate flooding in the manner shown in FIG. 2 and described in accompanying text.

From stage 324, operating routine 320 continues with a conditional 326 that tests whether to start the engine 42 or not. If the outcome of the test of the conditional 326 is negative (No), the routine loops back to repeat stage 324 in which engine 42 is halted and pumping system is at rest stage 324. If the outcome of the test of the conditional 326 is affirmative (Yes), then the engine 42 is started and operating routine advances to engine 42/system 30 idle operation 328. The conditional 326 and an operation 328 would typically be performed once the vehicle 22 has stopped at an appropriate location proximate to the water source W as part of the preparation process to abate a hazardous condition such as a wildfire, flood, or the like. During the operation 328, approximately the same effective diameters and sheave configurations of the drive pulley 63 and the driven pulley 65 as set forth for stage 324 persist in this operation. It should be noted that during operation 328, the pumping system 30 is just coming up to idle speed. The turn ratio TR is approximately 4:1 as represented in FIG. 8 and FIG. 9. As previously explained the features of the width control mechanism 64 and the width control mechanism spring 68*d* are configured to maintain this 4:1 turn ratio until operation past idle is initiated. Operating routine 320 proceeds next to trigger an operation 330. The operation 330 prepares to increase engine speed n beyond idle speed as triggered by reaching a certain trigger point relative to idle (typically 35%-40% of steady state/operating point speed), and prepares to change the turn ratio TR, beginning to decrease the drive:driven ratio from 4:1 (drive:driven<4:1 turn ratio TR). In support of this turn ratio TR change, the effective diameter of the drive pulley 63 begins to increase and the sheave portion 62*b* approaches the sheave portion 62*a*; and the effective diameter of the driven pulley 65 begins to decrease and the sheave portions 68*a* and 68*b* begin to separate. Typically, the operation 330 would be performed while the vehicle 22 is stationary at a location to ameliorate a fire, flood, or the like.

The operating routine 320 advances from the operation 330 to an upshift operation 332. In the upshift operation 332 the engine 42 speeds up from the trigger point 35%-40% of the engine operating point speed to 100% of its operating point speed. As the engine 42 speeds up, the drive pulley 63 turns faster so its effective diameter continues to increase with the sheave portions 62*b* and 62*a* coming together to provide the drive pulley effective diameter increase, the driven pulley 65 also turns faster so its effective diameter continues to decrease with the sheave portion 68*b* separating from the sheave portion 68*a* to provide a driven pulley effective diameter decrease, and continuous shifting between turn ratios TRs result from about 4:1 to about 1:1 that corresponds to upshifting of the CVT 60. In certain embodiments, the operations 330 and 332 would be performed after transport of the pumping system 30 to a remote sight proximate to water source W to prepare for firefighting, flood amelioration, or the like.

From the operation 332, the operating routine 320 continues with a steady state engine operation 334 per a flow line bridging FIG. 6 and FIG. 7 in the manner indicated by connection flags A6 appearing on each figure. In the operation 334, the engine 42 is operating at the target operating point (100% of steady state speed) and the drive:driven turn ratio is 1:1. This 1:1 turn ratio corresponds to that shown in FIG. 10 and FIG. 11. To provide this turn ratio configuration of the CVT 60, the drive pulley 63 is at or near its maximum effective diameter as provided by the sheave portions 62*a* and 62*b* being at or near closure; and the driven pulley 65 is at or near its minimum effective diameter as provided by the sheave portions 68*a* and 68*b* being at or near a maximum open state. Once at the desired remote site proximate to the water source W, the operation 334 is when water transport from source W to a desired site with pumping system 30 would begin. A hazardous condition abatement operation 420 encompasses all the operations and conditionals circumscribed by the phantom box with the 420 numerical labeling. The operation 420 includes delivering/transporting water with the pumping system 30 to address an environmentally hazardous condition, which may be performed during execution of any of the circumscribed operations/conditionals. From the operation 334, the operating routine 320 continues with a conditional 336. The conditional 336 tests whether there is a non-negligible increase in head H of the pump 80. If the test of conditional 336 is negative (No), then the operating routine 320 loops around operation 338 to conditional 340—in other words operating routine 320 skips operation 338 if conditional 336 is negative. If the test of conditional 336 is affirmative (Yes), then increasing head load compensation operation 338 is executed. Operation 338 continues by adjusting the turn ratio of CVT 60 to decrease water capacity output of pump 80 while maintaining engine speed n at or near 100% of its operation point speed. The non-negligible head H increase causes the impeller 90 to slow down, which imparts mechanical resistance to the driven pulley 65 via shafts 108, 70. In response, the driven pulley 65 slows down, which causes its effective diameter to increase as the sheave portion 68*b* starts closing in on the sheave portion 68*a*. The drive pulley 63 responds to the slow down by beginning to open the sheave portions 62*a* and 62*b*, which causes its effective diameter to decrease. Accordingly, the increased load on the CVT 60/engine 42 caused by increasing head H of the pump 80 correspondingly adjusts the drive:driven turn ratio from 1:1 towards 4:1 (1:1<drive:driven<4:1), while engine speed n stays at or near its operating point. With this increase in drive:driven turn ratio TR and maintenance of 100% of engine speed operating point, the result is a reduction in the turn rate of shaft 70 and shaft 108 (the "driven" rate) via the CVT 60. This reduction causes the impeller 90 rotation to slow down, decreasing the water capacity output (volumetric flow rate) of pump 80 as a result of the operation 338. Accordingly, the drive pulley (antecedent) tends to get more turns per turn of the driven pulley (consequent) the further the turn ratio TR moves away from 1:1, with the specific turn ratio depending on the degree of resistance/loading by the head H increase. Because the engine speed n is regulated relative to a target, the increasing turn ratio TR causes the output of the driven pulley 65 to be slower, reducing the water capacity output. The ratio TR may change all the way to 4:1 if the head H increase is large enough, but would not tend to do so during nominal operation of the pumping system 30. From the operation 338, the operating routine 320 advances to the conditional 340. The conditional 340 tests whether a non-negligible head H decrease has occurred. If the test of conditional 340 is negative (No), it loops around the operator 342 (skipping it) to the conditional 344. If the test of conditional 340 is affirmative (Yes), then the operating routine 320 continues with a non-negligible decreasing of head H load compensation operation 342. The compensation operation 342 arises most often when an adjustment to water capacity output (and the CVT 60 turn ratio TR) has already taken place as a result of execution of the operation 338. The compensation operation 342 operates in the opposite manner of the compensation operation 338. During execution of the operation 342, the driven pulley 65 responds to a lighter impeller load by opening the sheave portions 68a and 68b and correspondingly increasing the effective diameter of the variable width pulley 68 (equivalently driven pulley 65), and the drive pulley 63 responds to the change by closing the sheave portions 62a and 62b and correspondingly decreasing the effective diameter of variable width pulley 62 (equivalently drive pulley 63). As a result of the operation 342, water capacity output increases a corresponding amount.

The operating routine 320 continues from the operation 342 to a conditional 344. Upon completion of the operation 342, a water transfer operation 420 is exited (the operation 420 relates to the delivery/transfer of water to address an environmentally hazardous condition in parallel with the execution of the operations 334, 338, 342 and the conditionals 336, 340). The conditional 344 tests whether to return the pumping system 30 to idle speed. If the test of the conditional is negative, the operating routine 320 proceeds to a conditional 352 to determine whether to discontinue operating the pumping system 30. If the test of the conditional 352 is negative (No), the operating routine 320 returns to the steady state engine operation 334, re-entering operation 420. If the test of conditional 352 is affirmative (Yes), the operating routine 320 returns to the engine halted stage 324 returning to FIG. 6 from FIG. 7 as indicated by connection flags C5 present on each figure to representatively bridge the flow line thereacross, ceasing operation of the pumping system 30 and waiting until the conditional 326 is affirmative.

Returning to the conditional 344, if the test of the conditional 344 is affirmative (Yes), the operating routine 320 continues with a downshift operation 350, returning to FIG. 6 from FIG. 7, as indicated by connection flags B5 present on each figure to representatively bridge the flow line thereacross. In the downshift operation 350, the drive:driven turn ratio TR moves from 1:1 to 4:1 by decreasing the effective diameter of the drive pulley 63 with the sheave portions 62a, 62b parting; and increasing the effective diameter of the driven pulley 65 with the sheave portions 68a, 68b closing. The operating routine 320 proceeds from an operation 350 to the engine/system idle operation 328 previously described. Accordingly all the stages, operations, and conditionals (collectively operators) of the operating routine 320 have been described, including the flow line interconnections of all the operators. The operating routine 320 effectively halts by reaching the loop on FIG. 6 formed between engine halted/pumping system at the rest stage 324 and the conditional 326 with a negative test outcome (No), which is reached by an affirmative answer (Yes) for the conditional 352 (FIG. 7) via connection flags C5.

Many different embodiments of the present disclosure are envisioned. In one example, a methodology includes: providing a mobile water-pumping system to a selected site proximate to a water source, the system including: (a) an internal combustion engine, (b) a pump including an axial flow impeller positioned within a housing defining an intake and outlet, (c) a delivery conduit in sealed engagement with the outlet, and (d) a CVT including a power input shaft and an power output shaft; driving the power input shaft of the CVT with the internal combustion engine; rotating the axial flow impeller with the power output shaft of the CVT to operate the pump; mechanically governing selected operations of the system with the CVT, the CVT transferring power between the power input shaft and the power output shaft in accordance with a variable turn ratio, the CVT being responsive to a change in power input shaft speed and power output shaft speed to adjust the variable turn ratio; and during the rotating of the axial flow impeller shaft, moving water from the water source through the intake and discharging the water through the delivery conduit to perform at least one of: (a) fighting fire with the water discharged from the delivery conduit, (b) wetting flammable matter in a designated area to establish a fire break, and (c) moving the water to abate an existing or threatened flood condition.

In another example, a technique of the present disclosure comprises: moving a vehicle off-road to a position relative to a water source, the vehicle carrying a pumping system including: a rotary power source, a CVT with a power input shaft and a power output shaft, and a rotodynamic pump with an operative kinetic pump rotor, an intake, and an outlet; driving the power input shaft of the CVT with the rotary power source at an input rotational speed; turning the rotor with the power output shaft of the CVT to receive water from the water source through the intake and provide the water to the outlet at a first water capacity; delivering the water at the first water capacity through a conduit in fluid communication with the outlet to abate a hazardous condition including one or more of: a fire and a flood; in response to mechanical resistance from an increase in a hydraulic head of the pump, regulating the input rotational speed relative to a target rotational speed by adjustment of a turn ratio defined with the CVT, while the adjustment slows the turning of the rotor with the power output shaft to reduce the first water capacity to a second water capacity; and providing the water at the second water capacity through the conduit to continue to abate the hazardous condition.

A further example includes: an internal combustion engine with a controller and an engine power shaft, the controller regulating the engine to target a desired operating point speed of the engine power shaft; a pump including a housing and an axial flow impeller positioned in the housing, the housing defining an intake to the impeller and an outlet from the impeller; and a CVT including a power input shaft coupled to the engine power shaft to receive rotary engine power therefrom and a power output shaft coupled to the impeller to provide rotary power thereto, the CVT further including: a drive pulley with a first drive sheave fixed to the power input shaft and a second drive sheave movable relative to the first drive sheave; a driven pulley with a first driven sheave fixed to the power output shaft and a second driven sheave movable relative to the first driven sheave; an endless loop positioned about the drive pulley and the driven pulley and contacting each of the drive pulley and driven pulley to turn therewith; a first mechanism coupled to the drive pulley to move the second drive sheave toward the first drive sheave as drive rotary speed increases to increase drive pulley effective diameter and farther apart as the drive rotary speed decreases to decrease the drive pulley effective diameter; and a second mechanism coupled to the driven pulley to move the second driven sheave away from the first driven sheave as driven rotary speed increases to decrease driven pulley effective diameter and closer together as the driven rotary speed decreases to increase the driven pulley effective diameter.

In other embodiments, the rotodynamic pump of the present disclosure includes multiple rotor stages in the same pump unit that may or may not be the same type of impeller/rotor. In one example, two axial flow impeller stages of generally the same type/dimensions are aligned coaxially along a common rotational axis to provide one embodiment of a multistage pump of the present disclosure. In a further refinement, multiple stage impellers of such type may be integrally formed together. In some other embodiments, two or more stages may be utilized in a coaxial or non-coaxial configuration, and/or may be a mix of different types of impellers/rotors in the same pump. The different stages of such multistage pumps may be arranged in a serial (daisy-chained) arrangement, a parallel arrangement, or a combination of both. In other applications multiple pumps of a single or multistage variety may be used in a series, parallel, or a combination of the two. These multiple pump arrangements may all have the same impeller/rotor type or may be a mix of different types of impellers/rotors. Such mixes may occur within a multistage pump of the multiple pump arrangement and/or may occur with respect to different pumps in the multiple pump arrangement. In one multiple pump arrangement applicable to long haul transport of water, a spaced-apart series of pumps may utilized in a daisy-chained fashion (the output of one going to the input of the next, etc. . . . ) to move water from a water source to a remotely located fire and/or to sufficiently move water out of and away from a flood zone. In one alternative, multiple pumping subsystems "daisy-chained" together provide for a greater head distance H than a single pump. Daisy chaining can also be utilized to overcome frictional losses that might result from running long distances. It should be appreciated that multistage pumps and multiple pump arrangements are nonlimiting examples that may be covered by the following claims of the present disclosure to the extent such claims read thereon and/or any equivalent(s) thereof. Indeed, these examples are among many different variations, embodiments, examples, forms, and refinements not shown in the figures that may fall under the coverage of the present disclosure.

In certain other embodiments, an axial flow impeller particularly suited to remote/mobile firefighting has a maximum diameter in a range from about 5 inches through about 9 inches. Alternatively or additionally, the brake horsepower output by an internal combustion engine suitable for the same is in a range from about 300 horsepower through about 600 horsepower and runs with a target engine speed operating point of about 10,800 RPM. Some of these, as well as different embodiments have a typical water capacity range, which is also referred to as fluid output, from about 2000 GPM through about 15000 GPM; where water capacity is generally lower with a higher-valued head H of the pump in order to maintain engine operation at the desired operating point.

A number of initial field tests were performed, as outlined in Table 1 below, that resulted in some of the specific embodiments described above.

TABLE 1

Summary of initial field tests.

| Test | | Operational Definition | | Results Definition | |
|---|---|---|---|---|---|
| Component | Test # | Description | How | Result | Pass: y/n |
| Engine | 1 | Engine output 1 lb of boost – 8 hp increase. | Engine under load, measure turbo boost. Add to spec hp of 165 hp | 30 psi = 240 additional hp | Y |

TABLE 1-continued

Summary of initial field tests.

| Test | | Operational Definition | | Results Definition | |
|---|---|---|---|---|---|
| Component | Test # | Description | How | Result | Pass: y/n |
| Engine cooling system | 1 | Test main cooling system | Run engine at 7000 rpm with no load for 1 hour | 1 hour no load run produced 170 F. temp | Y |
| Intake cooling system | 1 | Test intake cooling system | Run engine at 7000 rpm with no load for 1 hour | 1 hour no load run produced higher temps than anticipated. | N |
| Intake cooling system | 2 | Test intake cooling system | Run engine at 7000 rpm with no load for 1 hour | 1 hour no load run produced acceptable temps. | Y |
| Pump test | 1 | Test flow by measuring distance water is thrown from a 4" nozzle, 300' = pass | Run engine at optimal rpm see what flow we get | Wouldn't prime | N |
| Pump test | 2 | Test flow by measuring distance water is thrown from a 4" nozzle, 300' = pass | Run engine at optimal rpm see what flow we get | Impeller was destroyed by gravel | N |
| Pump test | 3 | Test flow by measuring distance water is thrown from a 4" nozzle, 300' = pass | Run engine at optimal rpm see what flow we get | New impeller withstood sand gravel. Measured distance was 60' (2000 gpm) | N |
| Pump test | 4 | Test flow by measuring distance water is thrown from a 4" nozzle, 300' = pass | Run engine at optimal rpm see what flow we get | New housing/ impeller measured distance was 300' | Y |
| Pump test | 5 | Test impeller housing materials for wear | Run pump for 100 hours, measure wear from abrasives/ cavitation | New housing/ impeller measured wear was less than 1 thou after 100 hours | Y |

The intake cooling test (1) resulted in using an intake cooling system that is typically used in 1100 horsepower turbo-charged engines. For all of the pump tests, the 4" output nozzle was set at about a 45° angle from the horizon (plus or minus 10%). During pump test (1) the system did not prime because there was too much of a gap between the outer edge of the impeller blade and the inner surface of the impeller housing. This was addressed by tightening the tolerance between these two features. Optionally, this may be further addressed by adding non-ferrous materials to the edge of the impeller blades. The failure of Pump test (2) resulted in manufacturing the impeller from harder and more durable materials, as further described below. Pump test (3) resulted in the development of customized impeller designs based upon the following standards and calculations:

Standard Conversions:
1 sq. inch=about 0.004329 US gallon
1 sq. inch=about 0.00360465 Imperial gallon
1 cubic meter=about 220 imperial gallons
1 inch=about 2.54 centimetres
1 foot=12 inches
1 pound=about 0.453 kilograms
1 Imperial gallon=about 4.5 litres
Calculations:
1) 6" impeller with a 3" lift×3 lifts per rotation=254.34 cubic inches
×10,000 rpm=9,168 Imperial gpm.−764 gpm for center hub displacement.
×8,000 rpm=7,334 Imperial gpm.−611 gpm for center hub displacement.
×4,000 rpm=3,667 Imperial gpm.−305 gpm for center hub displacement.
2) 6.25" impeller with a 4" lift×2 lifts per rotation=245.3125 254.34 cubic inches
×10,000 rpm=8,842 Imperial gpm.−764 gpm for center hub displacement.
×8,000 rpm=7,074 Imperial gpm.−611 gpm for center hub displacement.
×4,000 rpm=3,537 Imperial gpm.−305 gpm for center hub displacement.
3) 6.25" impeller with a 3" lift×2 lifts per rotation=183.984 254.34 cubic inches
×10,000 rpm=6,631 Imperial gpm.−764 gpm for center hub displacement.
×8,000 rpm=5,305 Imperial gpm.−611 gpm for center hub displacement.
×4,000 rpm=2,652 Imperial gpm.−305 gpm for center hub displacement.
4) 6.25" impeller with a 2" lift×2 lifts per rotation=122.656 254.34 cubic inches
×10,000 rpm=4,421 Imperial gpm.−764 gpm for center hub displacement.
×8,000 rpm=3,537 Imperial gpm.−611 gpm for center hub displacement.
×4,000 rpm=1,768 Imperial gpm.−305 gpm for center hub displacement.
5) 6.0" impeller with a 5" lift×2 lifts per rotation=282.6 254.34 cubic inches
×10,000 rpm=10,186 Imperial gpm.−764 gpm for center hub displacement.
×8,000 rpm=8,149 Imperial gpm.−611 gpm for center hub displacement.
×4,000 rpm=4,074 Imperial gpm.−305 gpm for center hub displacement.
6) 6.0" impeller with a 3" lift×2 lifts per rotation=169.56 254.34 cubic inches
×10,000 rpm=6,112 Imperial gpm.−764 gpm for center hub displacement.
×8,000 rpm=4,889 Imperial gpm.−611 gpm for center hub displacement.
×4,000 rpm=2,444 Imperial gpm.−305 gpm for center hub displacement.
7) 6.0" impeller with a 2.5" lift×2 lifts per rotation=141.3 254.34 cubic inches
×10,000 rpm=5,093 Imperial gpm.−764 gpm for center hub displacement.
×8,000 rpm=4,074 Imperial gpm.−611 gpm for center hub displacement.
×4,000 rpm=2,037 Imperial gpm.−305 gpm for center hub displacement.
8) 8" impeller with a 3" lift×3 flights=452.16 254.34 cubic inches
×10,000 rpm=16,299 Imperial gpm.−764 gpm for center hub displacement.
×8,000 rpm=13,039 Imperial gpm.−611 gpm for center hub displacement.
×6,000 rpm=9,779 Imperial gpm.−470 gpm for center hub displacement.
×4,000 rpm=6,519 Imperial gpm.−305 gpm for center hub displacement.

In one embodiment of the present disclosure, the engine 42, the CVT 60 and the pump 80 of the pumping system 30 has a total, dry weight of about 290 to about 310 pounds and it is suitable to be secured to and transported upon a side-by-side recreational vehicle. Due to the arrangement of the engine 42, the CVT 60 and the pump 80, the pumping system 30 can achieve a fluid output of about 6,000 to about 11,000 Imperial gpm. The engine 42 can achieve a maximum operating rpm of about 13,200 with a maximum horsepower of about 600 horsepower was achieved at about 10,800 rpm and a maximum 1,300 pound foot of torque was imparted onto the impeller 90 at about 8,700 rpm. Most components of the CVT 60 were machined from billet aluminum, with the exception of the endless loop 66 and the bushings that were made from 43/40 steel to provide a structural integrity to the CVT 60 that was able to withstand the loads imparted on the CVT 60 when the pumping system 30 was operating.

Figure 12:
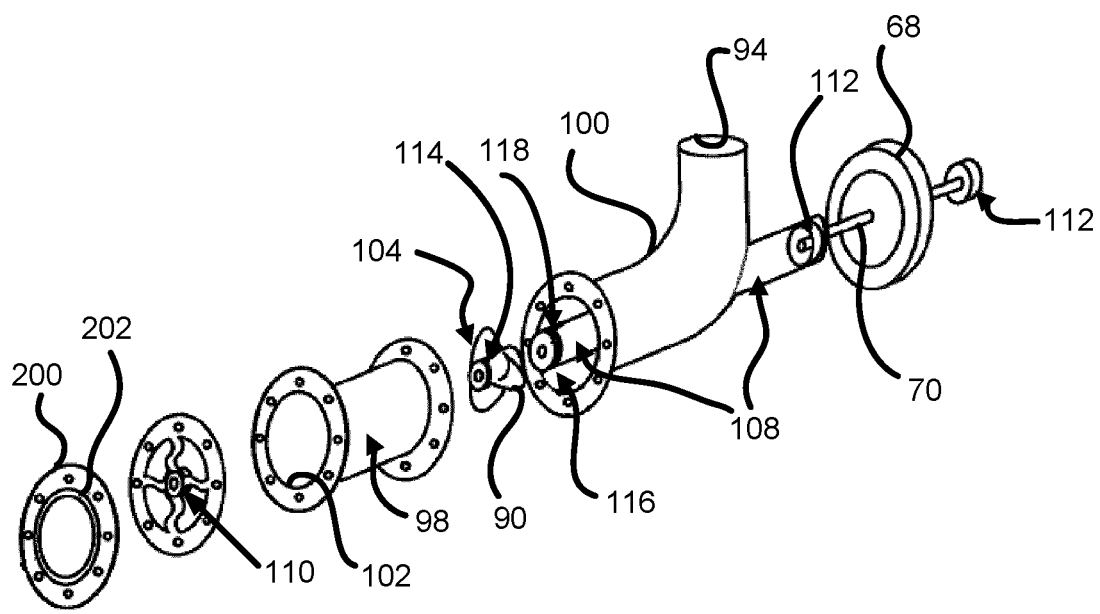
FIG. 12 is a partially-exploded isometric view of a portion of another embodiment of the pumping system of FIG. 3.
Figure 13:
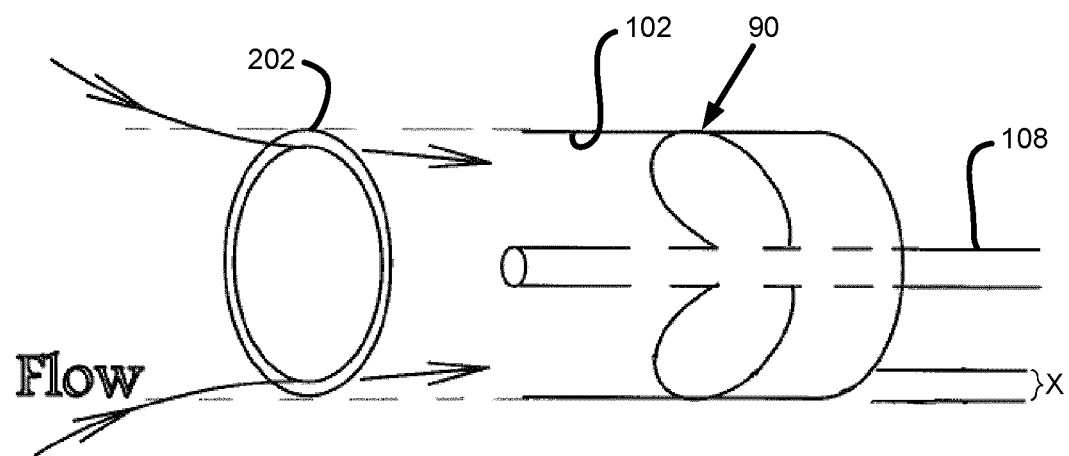
FIG. 13 a schematic diagram that depicts a flow of fluids through a select portion of the pumping system of FIG. 12.

An intake filter 120 that was a ¾ inch screen was attached to the intake conduit 82. The inner diameter of the impeller housing 98 was about 6 inches (about 15 cm) and a deflector ring 200 (as shown in FIG. 11 and FIG. 12) was employed within the impeller housing 98. The deflector ring 200 has an out diameter that is substantially the same as the diameter of the inner surface 102. The deflector ring 200 has inner diameter of about 5.5 inches, with the difference between the inner and outer diameters shown as X in FIG. 12. The deflector ring 200 was positioned about 6 inches towards the intake conduit 82 from the impeller 90. Without being bound by any particular theory, the deflector ring 200 directs any debris that passed through the intake screen 120 towards the mid-line center of the impeller housing 98. The deflector ring 200 decreased debris-induced damage and wear to the impeller 90. The impeller 90 comprised a 43/40 steel hub with QT 100 plate steel blades that had a pitch of 3 inches with 3 flights.

A further set of field tests were performed with a first further test having the following parameters: The pumping system 30 was positioned about 40 feet above a source W with the intake conduit 82 was about one hundred feet (approximately 30.5 meters) long, the output conduit 84 was about 1500 feet (about 457 meters) long with the manifold 85 positioned about 150 feet (about 45.7 meters) above the pumping system 30 (i.e. a static head of 150 feet, about 46 meters). Both of the conduits 82 and 84 were 6 inch (about 15 cm) diameter polymer line. The engine 42 was operated at about half throttle (about 6,500 rpm) and the pumping system 30 achieved a flow rate at the manifold 85 of about 2,000 Imperial gpm. The fuel consumption of the engine 42 was about 5 gallons of unleaded fuel per hour.

A second further field test was performed with the following parameters: the pumping system 30 was positioned within the source W with a 6 inch intake conduit 82 and a 4 four inch output conduit 84 with the manifold 85 positioned about 340 feet (about 104 meters) above the pumping system 30 (i.e. a static head of 340 feet). The engine 42 was run again at half throttle, again about 6,500 rpm, and the output flow was about 1000 Imperial gpm. The inventor notes that one limit on this field study was that the burst rating of the output conduit 84 was 300 pounds per square inch (psi), which limited the engine throttle to about 6,500 rpm so that the pressure of the water as it left the pump 80 did not exceed 300 psi and rupture the output conduit 84.

The further field-test performance of the pumping system 30 can be contrasted with other known pumping systems that are commercially available. For example, based upon publicly available performance information (see online at: <http://www.xylem.com/Assets/Resources/CD250M Hush-Pac EMEA-APAC Flyer 95-1016-1099-ENG 9.pdf> the disclosure of which is incorporated herein by reference), a Godwin CD250M series pump, which weighs about 6,700 pounds (about 6050 kg dry weight) and can achieve an output flow of about 1400 gpm under 150 feet of head H, however, while running this pump's engine at a maximum rpm of about 2200. In contrast, the Godwin CD250M series pump can achieve an output flow of 1600 gpm against a head H of 80 feet, while operating at about 1800 rpm. The Godwin CD250M series pump has a reported fuel consumption of about BEP 17 litres/hour when the engine is run at about 2000 rpm. There are other commercially available pumping systems that can achieve similar or greater flow outputs than the Godwin CD250M; however, each of these known pumping systems are multiple thousands of pounds in total weight and have fuel consumption rates, at optimal engine speeds, that far exceed the fuel consumption of the embodiments of the present disclosure.

Some embodiments of the present disclosure provide the following characteristics and output parameters:

the engine 42, the CVT 60 and the pump 80 of the pumping system 30 has a total, dry weight of between about 200 pounds to about 600 pounds and provides a fluid output of about 1 to about 5000 gpm with a static head of about 1 ft to about 500 ft the engine 42, the CVT 60 and the pump 80 of the pumping system 30 has a total, dry weight of between about 300 pounds to about 500 pounds and provides a fluid output of about 1 to about 4000 with a static head of about 1 ft to about 500 ft the engine 42, the CVT 60 and the pump 80 of the pumping system 30 has a total, dry weight of between about 300 pounds to about 500 pounds and provides a fluid output of about 1 to about 4000 gpm with a static head of about 1 ft to about 500 ft the engine 42, the CVT 60 and the pump 80 of the pumping system 30 has a total, dry weight of about 300 pounds to about 400 pounds and provides a fluid output of about 1 to about 3000 gpm with a static head of about 1 ft to about 500 ft the engine 42, the CVT 60 and the pump 80 of the pumping system 30 has a total, dry weight of about 300 pounds to about 325 pounds and provides a fluid output of about 1 to about 3000 with a static head of about 1 ft to about 500 ft the engine 42, the CVT 60 and the pump 80 of the pumping system 30 has a total, dry weight of about 300 pounds to about 325 pounds and provides a fluid output of about 1 to about 2500 gpm with a static head of about 1 ft to about 350 ft the engine 42, the CVT 60 and the pump 80 of the pumping system 30 has a total, dry weight of about 300 pounds to about 325 pounds and provides a fluid output of about 1 to about 2000 gpm with a static head of about 1 ft to about 200 ft the engine 42, the CVT 60 and the pump 80 of the pumping system 30 has a total, dry weight of about 300 pounds to about 325 pounds and provides a fluid output of about 1 to about 1000 gpm with a static head of about 1 ft to about 350 ft The aforementioned characteristics and output parameters may be expressed in one or more ratios. For example, a ratio of dry weight to fluid output when there is a head pressure within a given range.

Further embodiments of the present disclosure relate to a CVT pump that is of a modular design that comprises a high horsepower high rpm motor that is coupled to an impeller via a belt drive CVT, which drives the pump at up to about 13,200 rpm. The pump further comprised of an intake tail plate, an impeller housing, a main body outlet, and an impeller shaft, which may be is supported by a four-bearing system or not. The impeller may be a bi-vane or a tri-vane axial flow impeller with a single-stage, dual stage or multiple stage design with a nonferrous impeller vane sealing system that creates tight tolerances between an edge of the impeller vanes and an inner surface of the impeller housing. The CVT may operate at or between a 4 to 1 or a 1 to 1 ratio, depending on the head pressure at the impeller. The pump may provide a fluid output between 2,000 and 10,000 imperial gallons per minute, depending on the head pressure and distance for the fluid to travel. Without being bound by any particular theory, this pump may multiply the engine torque, via the CVT, in response to increasing head pressure at the impeller.

In further embodiments of the present disclosure the pump system may be used for: (a) the transfer of waste water/diluted sewage between retention ponds and/or to address potential overflow/cleanup of the same; (b) agricultural applications involving watering of animals and/or plants that may include water transfer to or between irrigation channels or the like; rapid bulk removal of water accumulated indoors due to plumbing failure, incursion of rain/melting snow, or the like-such as rapid removal of water from a flooded crawlspace and/or basement; or other liquid/slurry transfers that would benefit from a high volume rate of transfer-especially if any elevational increase is modest.

In yet a further embodiment, the pump system operates in a standalone mode that may or may not include any means of transport or otherwise be suitably mobile. It should be appreciated that width adjustment of the drive pulley 63 and the driven pulley 65 is mechanically implemented with the control mechanism 64 and the control mechanism spring 68d, respectively, being responsive to the rotational speed of the shafts 58a and 70. In certain embodiments, a different form of speed-responsive mechanical implementation is utilized. Rather than pure mechanical actuation in response to speed, some alternative embodiments actuate adjustment to the width of the drive pulley 63 and/or the driven pulley 65 by an electric motor (linear or rotary), hydraulically, or pneumatically.

In a different embodiment, opposing sheaves screw together to correspondingly adjust width. In still further embodiments, a CVT is utilized that has substantially different operating parameters, such as different turn ratio ranges, range extremes, one or more differently operating control mechanisms for a variable pulley CVT type or the like; and/or the CVT type is altogether different, instead being one of many potential alternative types, including but not limited to: a toroidal or roller-based CVT (extroid CVT), a magnetic CVT, a ratcheting CVT, a hydrostatic CVT, a naudic incremental CVT, a Cone CVT, a radial roller CVT, and/or a planetary CVT-just to name a few possibilities. In still other embodiments, a single or dual electronic clutch transmission with a suitable number of speeds could be utilized in lieu of or in combination with a CVT, Further CVT alternatives may be based on a non-continuous type of transmission with one or more gear trains, like a standard automatic transmission and/or manual transmission with or without electronic control suitably configured to transfer mechanical power between the rotary power source and pump subject to certain circumstances and conditions.

In further embodiments of the present disclosure, the engine 42 and/or the engine 28 may be adapted to perform other operations, such as generate electric power, supplement one another, or the like. For further embodiments, a rotary power source may be a different type of internal combustion engine other than that shown and described as the engine 42. For instance, the source 40 may be provided as a compression-ignited diesel-fueled engine; a traditional carbureted engine type without fuel injection; less traditional fueling with ethanol, natural gas, liquid petroleum gas, and/or liquid propane, or the like; a Wankel-type eccentric rotor type engine; and a gas turbine engine with constant or pulse type ignition-just to name a few. Alternative or additional rotary power sources for various other embodiments (not shown), may include a variable or constant speed electric motor, a wind-powered rotational power source (windmill or wind turbine with corresponding adjustment to TR values/range of CVT), a rotational power source powered by moving water through/over a dam, waterfall, a fast-moving stream, tidal water movement, and/or such other rotary power prime mover—as may depend on the given application of the pump system-just to provide a few examples.

For still other embodiments of the present disclosure, the rotor/impeller may be of a type that has more or fewer blades/vanes instead of three as described in connection with the depicted embodiments. One particular alternative is directed to a pump system including a bi-vane axial flow impeller. In some embodiments, a pump system comprises: (a) a rotodynamic pump including a rotor and a housing defining an intake, an outlet, and a passage in which the rotor is positioned, the rotor including an outer edge portion comprised of a self-lubricious, nonferrous material having a hardness greater than or equal to 275 on the Brinell hardness scale; (b) a rotary power source; and (c) a power transmission device mechanically coupled to the rotary power source and the pump to transfer mechanical power therebetween. In one embodiment, the self-lubricious, nonferrous material is comprised of one or more of: Ag, Al, Au, B, Ba, C, Ca, Ce, Co, Cr, Cs, Cu, F, In, Mo, N, Ni, Pb, Re, Sn, Si, Ta, Ti, V, W, Zn, and Zr. In another embodiment, the material resulting from application of the immediately preceding sentence further comprises at least one of: $BaF_2$, $CaF_2$, $CeF_3$, and a chalcogenide, the chalcogenide being formed with one or more of: Al, Ba, Ca, Ce, Co, Cr, Cs, Cu, In, Mo, Ni, Pb, Re, Sn, Ta, Ti, V, W, Zn, and Zr. In another embodiment, the material includes one or more of: hexagonal boron nitride, chromium carbide, chromium nitride, molybdenum nitride, silicon nitride, titanium carbide, titanium nitride, and tungsten carbide. In another embodiment, the material comprises a combination of at least two different metal elements each selected from a group consisting of: Al, Ba, Ca, Ce, Co, Cr, Cs, Cu, In, Mo, Ni, Pb, Re, Sn, Ta, Ti, V, W, Zn, and Zr. In another embodiment, a group of sets each represent a unique combination of different atomic element constituents, the material including the different atomic element constituents of one or more of the sets selected from the group, the sets consisting of: {Al, Cr, Ni, Mo}; {Cr, Mo, N}; {Cr, Mo, W}; {Cr, N, Ag}; {Cr, Al, V, N}; {Cr, Al, Si, N}; {Ti, Al, C}; {Ti, Al, N}; {Ti, C, N}; {Ti, Al, V, N}; and {Ti, Al, Si, N}; each of the sets being designated by inclusion within a pair of braces without restriction to a stoichiometric or non-stoichiometric relationship between the constituents of any one of the sets or between the sets relative to each other. In yet another embodiment, a group of sets each represent a combination of different compositional constituents in each of two layers of the material, the material including the different compositional constituents of one or more of the sets selected from the group, the sets consisting of: {Ni, Al, Ag, $BaF_2/CaF_2$ W}; {Ni, Al, Ag, Mo, $BaF_2/CaF_2$}; {Ti, Al, V, N/Ti, Al, N}; {Ti, Al, N/V, N}; {Ti, Al, C, N/V, C, N}; {Ni, Al, Ag, $BaF_2/CaF_2$, Ag, Cr}; {Ni, Al, Ag, $BaF_2/CaF_2$, Ag, Cr}; {$Mo_2N$/Ag}; {$Mo_2N$/Cu}; {Mo, N/Cu}; and {Mo, N/Si, N}; the compositional constituents of each of the sets being designated by inclusion within a corresponding pair of braces, and the compositional constituents of each of the two layers being on either side of a backslash positioned in between the corresponding pair of braces.

Any experiment, theory, thesis, hypothesis, mechanism, proof, example, belief, speculation, conjecture, guesswork, discovery, investigation, or finding stated herein is meant to further enhance understanding of the present disclosure without limiting the construction or scope of any portion of the present disclosure. For any particular reference to "embodiment" or the like, any aspect(s) described in connection with such reference are included therein, but are not included in nor excluded from any other embodiment absent reasonable description to the contrary. For multiple references to "embodiment" or the like, some or all of such references refer to the same embodiment or to two or more different embodiments depending on corresponding modifier(s) or qualifier(s), surrounding context, and/or related description of any aspect(s) thereof-understanding two embodiments differ only if there is some substantive distinction, including but not limited to any substantive aspect described for one but not included in the other. Any use of the words: important, critical, crucial, significant, essential, salient, specific, specifically, imperative, substantial, extraordinary, especially, favor, favored, favorably, favorable, desire, desired, desirable, desirably, particular, particularly, prefer, preferable, preferably, preference, and preferred indicates that the described aspects being modified thereby may be desirable (but not necessarily the only or most desirable), and further may indicate different degrees of desirability among different described aspects; however, the claims that follow are not intended to require such aspects or different degrees associated therewith except to the extent expressly recited, but the absence of such recitation does not imply or suggest that such aspects are required to be absent from the claim either. For any method or process claim that recites multiple acts, conditionals, elements, gerunds, stages, steps, operations, phases, procedures, or other claimed features; no particular order or sequence of performance of such features is thereby intended unless expressly indicated to the contrary as further explained hereinafter. There is no intention that method claim scope (including order/sequence) be qualified, restricted, confined, limited, or otherwise influenced because: (a) the method/process claim as written merely recites one feature before or after another; (b) an indefinite article accompanies a method claim feature when first introduced and a definite article thereafter (or equivalent for method claim gerunds) absent compelling claim construction reasons in addition; or (c) the claim includes alphabetical, cardinal number, or roman numeral labeling to improve readability, organization, or other purposes without any express indication such labeling intends to impose a particular order. In contrast, to the extent there is an intention to limit a method/process claim to a particular order or sequence of performance: (a) ordinal numbers (1st, 2nd, 3rd, and so on) or corresponding words (first, second, third, and so on) shall be expressly used to specify the intended order/sequence; and/or (b) when an earlier listed feature is referenced by a later listed feature and a relationship between them is of such a type that imposes a relative order because construing otherwise would be irrational and/or any compelling applicable claim construction principle(s) support an order of the earlier feature before the later feature. However, to the extent claim construction imposes that one feature be performed before another, the mere ordering of those two features is not intended to serve as a rationale or otherwise impose an order on any other features listed before, after, or between them. Moreover, no claim is intended to be construed as including a means or step for performing a specified function unless expressly introduced in the claim by the language "means for" or "step for," respectively. As used herein, "portion" means a part of the whole, broadly including both the state of being separate from the whole and the state of being integrated/integral/contiguous with the whole, unless expressly stated to the contrary. Representative embodiments in the foregoing description and other information in the present disclosure possibly may appear under one or more different headings/subheadings. Such headings/subheadings go to the form of the application only, which while perhaps aiding the reader, are not intended to limit scope or meaning of any embodiments, or description set forth herein, including any claims that follow. Only representative embodiments have been described, such that: acts, additions, advantages, alterations, apparatus, aspects, benefits, changes, components, compositions, constituents, deletions, devices, embodiments, equivalents, features, forms, implementations, materials, methods, modifications, objects, operations, options, phases, processes, refinements, steps, stages, structures, substitutions, systems, techniques, and variations that come within the meaning of any embodiments defined or described herein, including any of the following claims, are desired to be protected.

What is claimed is:

1. A pumping system comprising:
a motor with a rotary output shaft;
a pump with a fluid input that is fluidly connected, when the pump is in use, to a fluid source that is external to the pumping system, a fluid output and an impeller positioned inside the pump between the fluid input and the fluid output, wherein the pump is a rotodynamic pump; and
a continuously variable transmission (CVT) that is operatively connected to the rotary output shaft of the motor and to an impeller shaft for providing rotary power from the motor to the impeller, wherein the CVT is a belt drive CVT comprising a variable width drive pulley operatively connected to the rotary output shaft of the motor; a variable width driven pulley operatively connected to the impeller shaft; and a belt positioned about opposing sheave portions of each of the drive pulley and driven pulley and contacting the opposing sheave portions of each of the drive pulley and driven pulley to turn therewith, wherein in operation, tensioning of the belt to engage each pulley is by only the variable widths of the drive pulley and the driven pulley by increasing or decreasing the distance separating the opposing sheave portions, wherein when the motor is at idle the opposing sheaves of the drive pulley are spaced substantially a maximum distance apart and the opposing sheaves of the driven pulley are spaced substantially a minimum distance apart or not at all, and wherein when the motor increases a rotational speed of the rotary output shaft, the distance separating the opposing sheaves of the drive pulley decreases and the distance separating the opposing sheaves of the driven pulley increases.

2. The pumping system of claim 1, wherein the pumping system can provide a fluid output between 1 to 5000 Imperial gallons per minute with about 1 to about 500 feet of static pressure head.

3. The pumping system of claim 1, wherein the impeller is one of an axial-flow impeller, a mixed-flow impeller, a radial-flow impeller or a centrifugal impeller.

4. The pumping system of claim 1, wherein the pump comprises a housing for defining the fluid input and fluid output and for housing the impeller.

5. The pumping system of claim 4, wherein the housing further comprises a deflector ring that extends from an inner surface of the housing, the deflector ring is positioned between an inlet of the fluid input and the impeller.

6. The pumping system of claim 1, further comprising a motorized vehicle for carrying and transporting the motor, the pump and the CVT.

7. The pumping system of claim 6, wherein the motorized vehicle is a side-by-side vehicle.

8. The pumping system of claim 1, wherein the rotodynamic pump is one of a centrifugal pump, an axial-flow pump or a mixed-flow pump.

9. The pumping system of claim 6, wherein the motor, the pump and the CVT are removably mountable upon a skid for the carrying and transporting upon the motorized vehicle.

10. The pumping system of claim 1, wherein the impeller has a maximum diameter in a range of between about 4 inches and about 12 inches.

11. The pumping system of claim 1, wherein the fluid output comprises an elbow outlet turning away from the rotational axis of the impeller.

12. The pumping system of claim 11, wherein said elbow outlet decreases in cross-sectional area over its length away from the impeller.

13. The pumping system of claim 1, wherein the motor with a rotary output is a non-diesel, gasoline internal combustion engine.

14. The pumping system of claim 1, wherein the pumping system can provide a fluid output between about 2,000 and about 10,000 Imperial gallons per minute.

15. The pumping system of claim 1, wherein the impeller is an axial-flow impeller.

16. The pumping system of claim 15, wherein the axial-flow impeller comprises a self-lubricious, nonferrous impeller material along at least a leading edge thereof, the leading edge being structured to meet an inner surface of an impeller housing of the pump to reduce clearance therebetween to enhance pump efficiency.

17. The pumping system of claim 1, wherein the pumping system can provide a fluid output between about 6,000 and about 11,000 Imperial gallons per minute.

18. The pumping system of claim 1, wherein the CVT is adjustable to maintain a steady state operating speed of the rotary power source in response to a head fluctuation.

19. The pumping system of claim 1:
wherein the CVT transfers power between the rotary output shaft of the motor and the impeller shaft in accordance with a variable turn ratio, the CVT being responsive to change in rotary output shaft speed and impeller shaft speed to adjust the variable turn ratio;
wherein the CVT is adjustable in response to mechanical resistance caused by a head increase of the pump; and
wherein in response to the mechanical resistance, the CVT adjusts the variable turn ratio to maintain regulation of motor rotational speed relative to a target operating point by increasing turning of the rotary output shaft relative to each turn of the impeller shaft, which slows rotation of the impeller to decrease fluid capacity output from the pump while increasing a torque imposed on the impeller for generating a head pressure output that is greater than when the torque is not increased.

20. A continuously variable transmission (CVT) pump for conveying a fluid from a fluid source external to the pump to a selected destination, the CVT pump comprising:

a rotodynamic pump having an inlet connected, when in use, to the fluid source for receiving the fluid, an outlet for delivering the fluid, and an impeller positioned therebetween;
a rotary power source; and
a belt drive CVT for transferring rotary power provided by the rotary power source to the rotodynamic pump, the CVT comprising:
a variable width drive pulley operatively connected to a rotary output shaft of the rotary power source, the drive pulley comprising opposing sheave portions that decrease in distance from each other as rotation of the drive pulley increases;
a variable width driven pulley operatively connected to an impeller shaft of the impeller, the driven pulley comprising opposing sheave portions that increase in distance from each other as rotation of the driven pulley increases; and
a belt positioned about the opposing sheave portions of each of the drive pulley and driven pulley and in contact with the opposing sheave portions of each of the drive pulley and driven pulley to turn therewith, the belt tensioned only by adjustment of distance between the opposing sheave options of each of the drive pulley and driven pulley.

* * * * *